US012766850B2

(12) United States Patent
Kanasugi et al.

(10) Patent No.: US 12,766,850 B2
(45) Date of Patent: Oct. 20, 2026

(54) INKJET PRINTING APPARATUS AND CONTROL METHOD

(71) Applicant: CANON KABUSHIKI KAISHA, Tokyo (JP)

(72) Inventors: Yuichiro Kanasugi, Tokyo (JP); Isamu Horiuchi, Kanagawa (JP); Akihiro Tomida, Kanagawa (JP); Masaya Uetsuki, Kanagawa (JP); Noribumi Koitabashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 116 days.

(21) Appl. No.: 18/978,446

(22) Filed: Dec. 12, 2024

(65) Prior Publication Data

US 2025/0214347 A1 Jul. 3, 2025

(30) Foreign Application Priority Data

Dec. 27, 2023 (JP) ................................ 2023-220888

(51) Int. Cl.

| | |
|---|---|
| ***B41J 2/18*** | (2006.01) |
| ***B41J 2/175*** | (2006.01) |
| ***B41J 2/21*** | (2006.01) |
| ***B41J 29/00*** | (2006.01) |

(52) U.S. Cl.

CPC ................ *B41J 2/18* (2013.01); *B41J 2/175* (2013.01); *B41J 2/2117* (2013.01); *B41J 29/00* (2013.01)

(58) Field of Classification Search

CPC ... B41J 2/18; B41J 2/175; B41J 2/2117; B41J 2/165

See application file for complete search history.

(56) References Cited

U.S. PATENT DOCUMENTS

| | | | | |
|---|---|---|---|---|
| 8,313,188 | B2 | 11/2012 | Muro | |
| 8,608,277 | B2 | 12/2013 | Tomida | |
| 8,636,334 | B2 | 1/2014 | Nishioka | |
| 9,010,896 | B2 | 4/2015 | Tomida | |
| 9,211,748 | B2 | 12/2015 | Baba | |
| 11,840,101 | B2 | 12/2023 | Ushiyama | |
| 11,999,177 | B2 | 6/2024 | Kanda | |
| 12,077,002 | B2 * | 9/2024 | Mizutani | B41J 2/01 |
| 2020/0108629 | A1 * | 4/2020 | Nakano | B41J 2/14 |
| 2024/0001678 | A1 * | 1/2024 | Tomida | B41J 2/1404 |
| 2024/0198691 | A1 | 6/2024 | Uetsuki | |
| 2024/0416662 | A1 | 12/2024 | Tomida | |
| 2025/0026130 | A1 | 1/2025 | Ogata | |

FOREIGN PATENT DOCUMENTS

| | | |
|---|---|---|
| JP | 2017-007131 A | 1/2017 |

* cited by examiner

*Primary Examiner* — Kristal Feggins

(74) *Attorney, Agent, or Firm* — Venable LLP

(57) ABSTRACT

An ink circulation type inkjet printing apparatus obtains a return time that is a time at which the inkjet printing apparatus returns from a first state that is a state in which a print operation is halted to a second state that is a state in which the print operation is executable, and a control unit executes pre-return maintenance including ink circulation by a circulation unit for causing the inkjet printing apparatus to return to the second state after transition of the inkjet printing apparatus to the first state, and completes the pre-return maintenance before the obtained return time.

25 Claims, 17 Drawing Sheets

800

| ABANDONED TIME PERIOD Tc | CHROMATIC COLOR INKS | | WHITE AND METALLIC INKS | |
|---|---|---|---|---|
| 0≤Tc≤THREE HOURS | - | - | CIRCULATION AND AGITATION | 15 MINUTES |
| THREE HOURS≤Tc≤SIX HOURS | CIRCULATION | 15 MINUTES | CIRCULATION AND AGITATION | 30 MINUTES |
| SIX HOURS≤Tc≤11 HOURS | CIRCULATION | 15 MINUTES | CIRCULATION AND AGITATION | 45 MINUTES |
| 11 HOURS≤Tc | CIRCULATION<br>NOZZLE BLADE WIPING<br>NOZZLE SUCTION WIPING | 30 MINUTES | CIRCULATION AND AGITATION<br>NOZZLE BLADE WIPING<br>NOZZLE SUCTION WIPING | 60 MINUTES |

FIG.8

1600

| INK TYPE | COMPLETION FLAG |
| --- | --- |
| W | 0 (ONGOING) |
| C | 1 (COMPLETED) |
| M | 1 (COMPLETED) |
| Y | 1 (COMPLETED) |
| K | 1 (COMPLETED) |

FIG.16

INKJET PRINTING APPARATUS AND CONTROL METHOD

BACKGROUND OF THE DISCLOSURE

Field of the Disclosure

The present disclosure relates to halting and returning of ink circulation in an ink circulation type inkjet printing apparatus.

Description of the Related Art

An inkjet technique is required to widely expand also to industrial applications. For example, there are inks in which color materials, for example, a white pigment such as titanium oxide, a metallic pigment such as aluminum, a disperse dye for textile, and the like are dispersed. These color materials tend to precipitate, and in the case where concentration unevenness of the color materials occurs in the inks, a desired image cannot be obtained in some cases. Accordingly, the concentration unevenness needs to be reduced by circulating the inks and agitating the inks in tanks before start of printing.

However, a problem here is that, in the case where a preparation operation including the circulation and the agitation of the inks is started after activation of an apparatus, a certain time period is required until the apparatus goes into a state where the inks can be ejected without concentration unevenness, and the productivity decreases. Meanwhile, assume a case where the circulation and the agitation of the inks are continued also during a halt period in which the apparatus does not perform a print operation. A problem in this case is that a pump for circulation wears at a faster rate and the productivity decreases due to downtime caused by pump replacement.

Regarding the ink circulation during the halt period, Japanese Patent Laid-Open No. 2017-007131 (Patent Literature 1) proposes intermittent circulation in which an ink is circulated at predetermined time intervals during a non-operation period of an inkjet printing apparatus. Moreover, Patent Literature 1 proposes that, in the case where an instruction of main power ON, apparatus operation, or the like is made during the non-operation period, the ink circulation is started as a preliminary operation. An operation time period of a pump can be expected to be reduced from that in case where the ink circulation is constantly continued also during the halt period, by performing the intermittent ink circulation and the ink circulation in returning as described above.

However, in the procedure disclosed in Patent Literature 1, the ink circulation is started at a moment where a user performs the instruction of main power ON or apparatus operation. Accordingly, a time period of waiting until the inkjet printing apparatus goes into a state where the ink can be ejected without the concentration unevenness occurs, and there is a room for improvement.

An object of the present disclosure is to reduce a time period in which a user waits until an apparatus goes into a state where an ink can be ejected without concentration unevenness after return from a halt state while reducing an operation time of ink circulation.

SUMMARY OF THE DISCLOSURE

An inkjet printing apparatus of the present disclosure includes: a print head configured to perform a print operation of printing an image by ejecting an ink; a circulation unit configured to circulate the ink by supplying the ink from a tank to the print head and returning the ink collected from the print head to the tank; a control unit configured to control the print operation by the print head and ink circulation by the circulation unit; and an obtaining unit configured to obtain a return time that is a time at which the inkjet printing apparatus returns from a first state that is a state in which the print operation is halted to a second state that is a state in which the print operation is executable, and the control unit executes pre-return maintenance including the ink circulation by the circulation unit for causing the inkjet printing apparatus to return to the second state after transition of the inkjet printing apparatus to the first state, and completes the pre-return maintenance before the return time obtained by the obtaining unit.

Further features of the present disclosure will become apparent from the following description of exemplary embodiments with reference to the attached drawings.

BRIEF DESCRIPTION OF THE DRAWINGS

FIG. 8 is a diagram illustrating an example of a table in which contents of maintenance are determined depending on an abandoned time period;

FIG. 16 is a diagram illustrating an example of a maintenance completion flag.

DESCRIPTION OF THE EMBODIMENTS

Hereinafter, with reference to the attached drawings, the present disclosure explains some example embodiments in detail. Configurations shown in the following embodiments are merely exemplary and some embodiments of the present disclosure are not limited to the configurations shown schematically.

Physical property values described in the present specification are values at normal temperature (25° C.) unless otherwise noted.

First Embodiment

Figure 1:
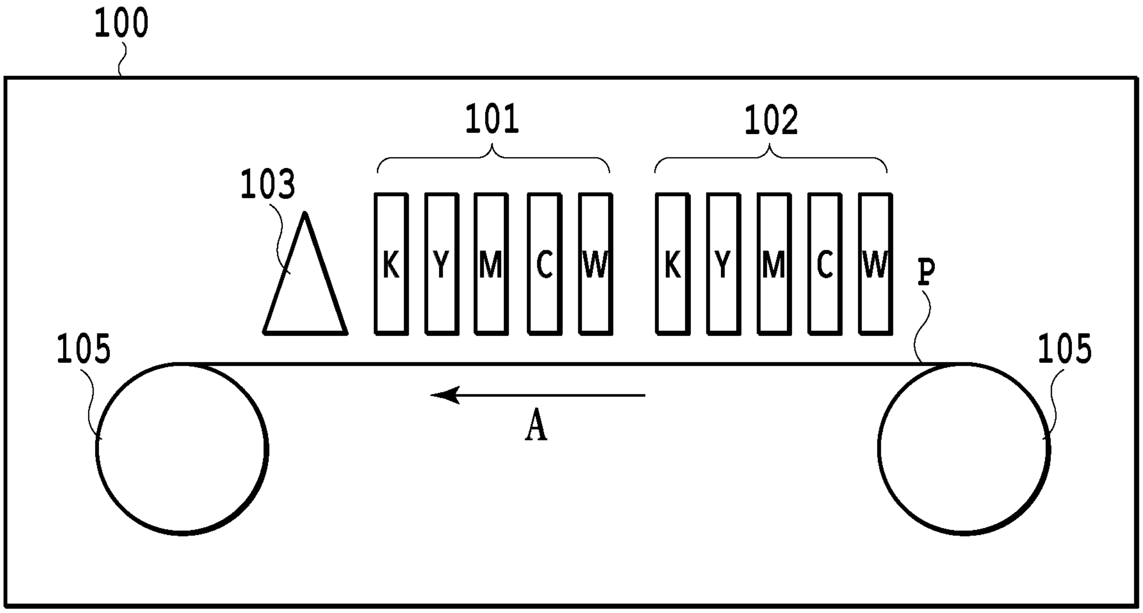
FIG. 1 is a diagram schematically illustrating a hardware configuration an inkjet printing apparatus.

FIG. 1 is a diagram schematically illustrating a hardware configuration of an inkjet printing apparatus (hereinafter, printing apparatus 100). The printing apparatus 100 includes print heads 101, tanks 102, a drying unit 103, and a conveyance unit 105. The conveyance unit 105 conveys a print medium (hereinafter, referred to as sheet P) along a conveyance path. The arrow A in FIG. 1 illustrates a conveyance direction of the sheet P. Note that, in the drawings, X is a horizontal direction, Y is a vertical direction, and Z is a direction orthogonal to the X direction and the Y direction.

The sheet P not only includes paper used in a general printing apparatus, but also widely includes materials that can receive inks such as vinyl, cloth, a plastic film, a metal plate, glass, ceramic, wood, and leather. Moreover, the sheet may be a continuous sheet continuous in a longitudinal direction. Furthermore, the sheet may be a label sheet on which multiple labels are removably attached.

In the conveyance path of the sheet P, the sheet P passes a position facing ink ejection ports of the print heads 101 and the drying unit 103. The conveyance unit 105 includes a conveyance roller, an auxiliary roller, a belt, and the like, and is driven by a conveyance motor. The conveyance motor is driven by a control signal from a control unit 500. The sheet P is subjected to printing by the print head 101 and drying by the drying unit 103 while being conveyed by the conveyance unit 105, and is then discharged from a sheet discharge port. The drying unit 103 is formed of, for example, a hot-air dryer or the like.

For example, the print head 101 is provided for each of ink types (colors) such as white (W), cyan (C), magenta (M), yellow (Y), and black (K). For each ink type (color), the tank 102 for storing the ink is connected to the print head 101. Multiple ink ejection ports are provided in each print head 101 to face a printing surface of the sheet P. The printing apparatus 100 prints an image by ejecting the inks from the print heads 101 to the sheet P. The control unit 500 controls the ink ejection from the print heads 101 via a head driver 518. The head driver 518 executes a print operation by the print heads 101 in conjunction with a conveyance operation of the sheet P, and performs print processing.

In the case where a foreign substance or the ink thickened by drying is present in the ink ejection port (nozzle), ejection failure such as non-ejection in which no ink is ejected by an effect of the foreign substance or the thickened ink may occur. Moreover, concentration unevenness due to precipitation sometimes occurs in the ink in each print head 101, each tank 102, and channels to be described later. Particularly, the concentration unevenness tends to occur in white (titanium oxide or the like) and metallic (aluminum or the like) inks in which color materials with high specific gravities are often used.

Figure 2:
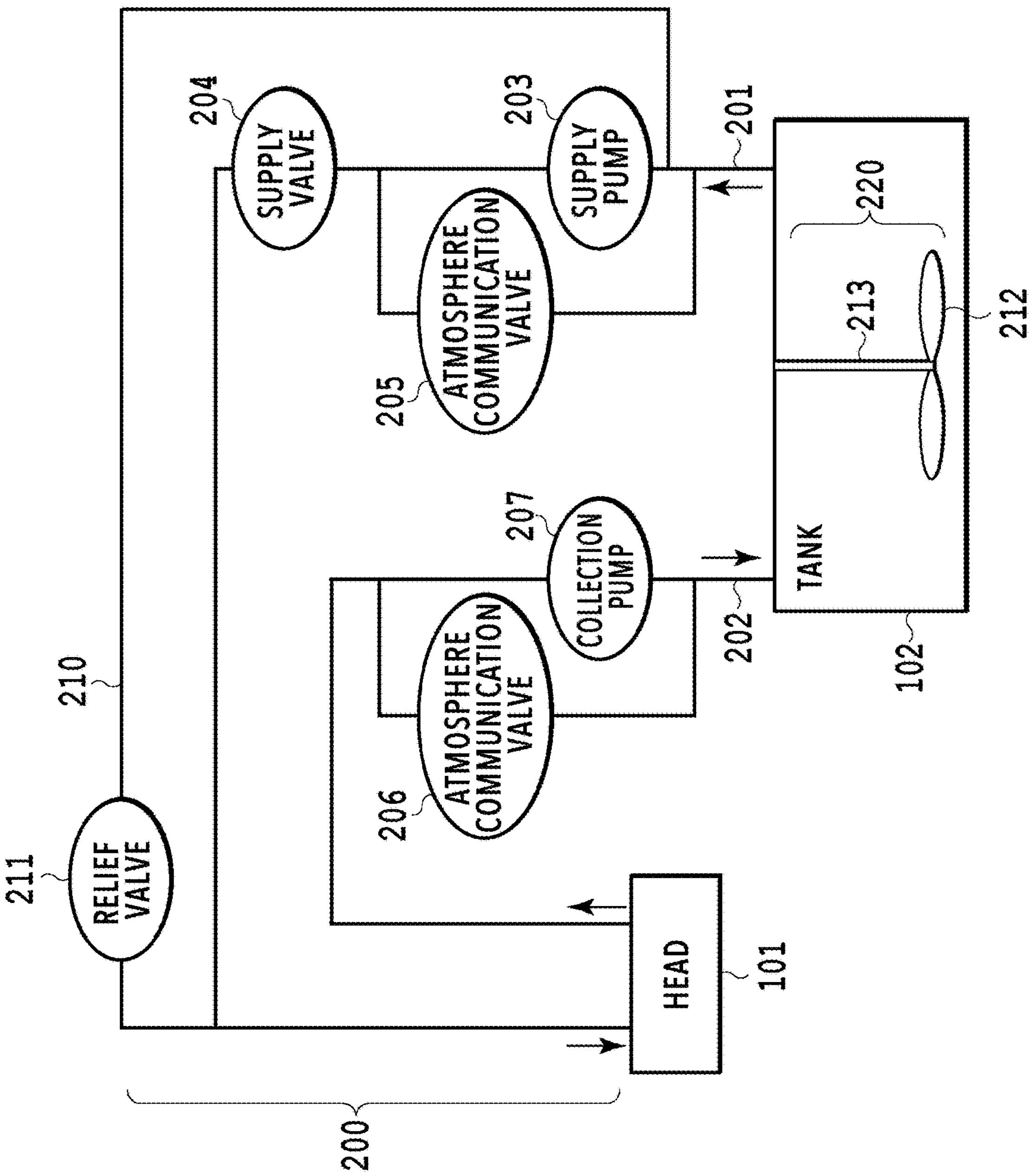
FIG. 2 is a diagram schematically illustrating an ink circulation unit and an ink agitation unit.

In order to reduce such ejection failure and concentration unevenness, the printing apparatus 100 according to the present embodiment includes an ink circulation unit 200 and an ink agitation unit 220 as illustrated in FIG. 2.

Figure 5:
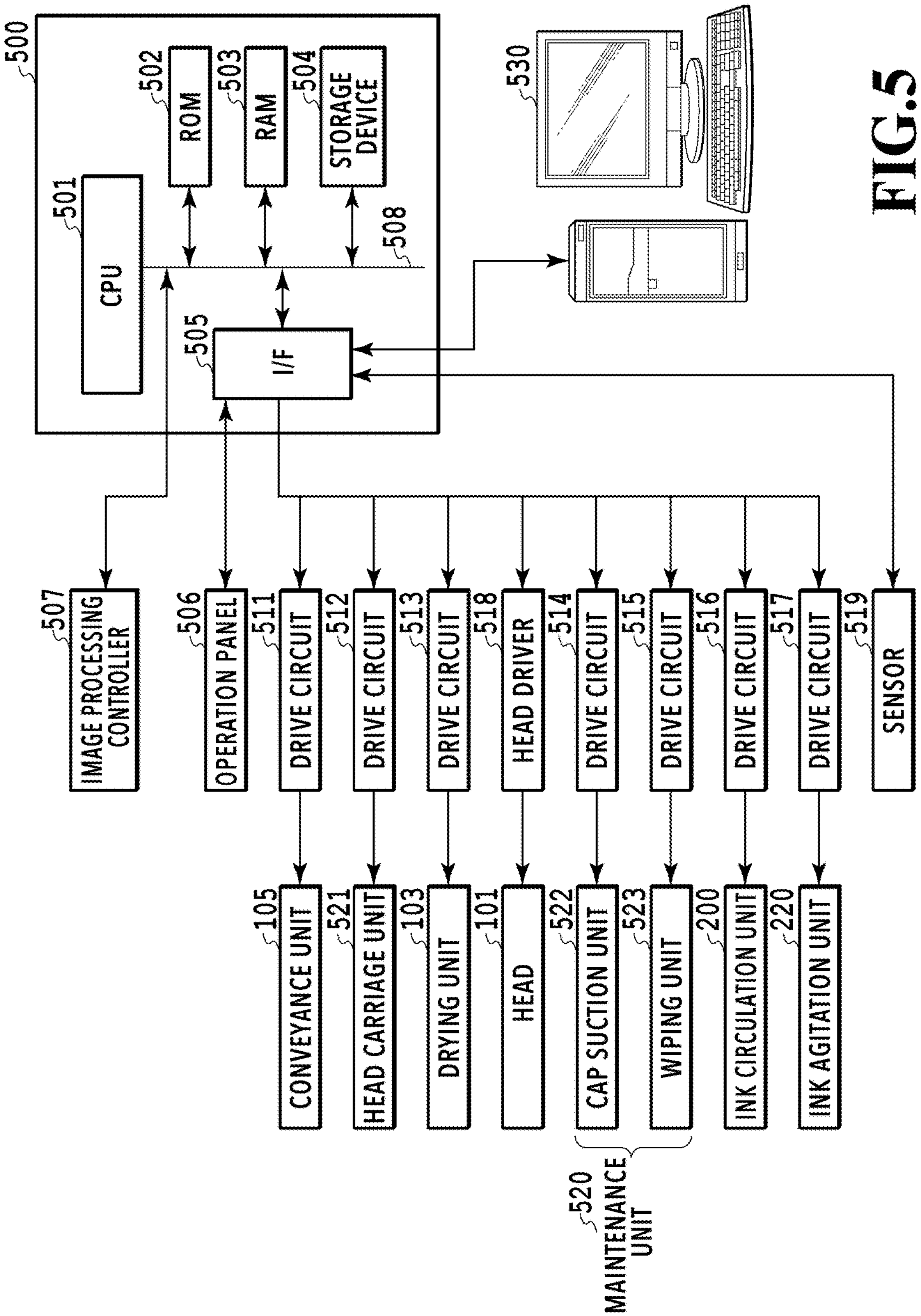
FIG. 5 is a block diagram illustrating a control configuration of the inkjet printing apparatus.

FIG. 2 is a diagram including the ink circulation unit 200 and the ink agitation unit 220 adopted in the printing apparatus 100 of the present embodiment. Although a channel configuration for one type of ink is illustrated in FIG. 2, the same configuration is provided for each type of ink in actual. Moreover, the ink agitation unit 220 does not have to be provided for all types of inks, and there may be adopted a configuration in which the ink agitation unit 220 is provided only for the white ink or the metallic ink in which color materials with high specific gravities are often used. Operations of the ink circulation unit 200 are controlled by the control unit 500 (FIG. 5). Configurations of parts of the ink circulation unit 200 are explained below.

The ink circulation unit 200 includes a supply channel 201 that supplies the ink from the tank 102 to the print head 101 and a collection channel 202 that collects the ink not ejected from the print head 101 into the tank 102. A pump and a valve are arranged in the middle of each of the channels 201 and 202, and the ink is circulated by causing the pump to operate. The channels may include a filter, a deaeration filter, or the like in the channels.

The ink is mainly circulated through the channels present between the print head 101 and the tank 102 that is a liquid container. An ejection operation of the ink is performed in the print head 101 based on image data, and the not-ejected ink is collected into the tank 102 again. The tank 102 storing a predetermined amount of ink is connected to the supply channel 201 for supplying the ink to the print head 101 and the collection channel 202 for collecting the ink from the print head 101.

The printing or circulation path may include, in addition to the supply channel 201 and the collection channel 202, a relief channel 210 for stabilizing pressure inside the circulation channels.

The supply channel 201 is a channel for supplying the ink from the tank 102 to the print head 101, and a supply pump 203 and a supply valve 204 are arranged in the middle of the supply channel 201. During the ink circulation, the supply pump 203 is driven with the supply valve 204 opened. The ink can be thereby circulated in the ink circulation path while being supplied to the print head 101. An amount of the ink ejected by the print head 101 per unit time fluctuates depending on the image data. A flow rate of the supply pump 203 is preferably determined such that the supply pump 203 can also handle the case where the print head 101 performs the ejection operation at the maximum ink consumption amount per unit time.

Figure 3:
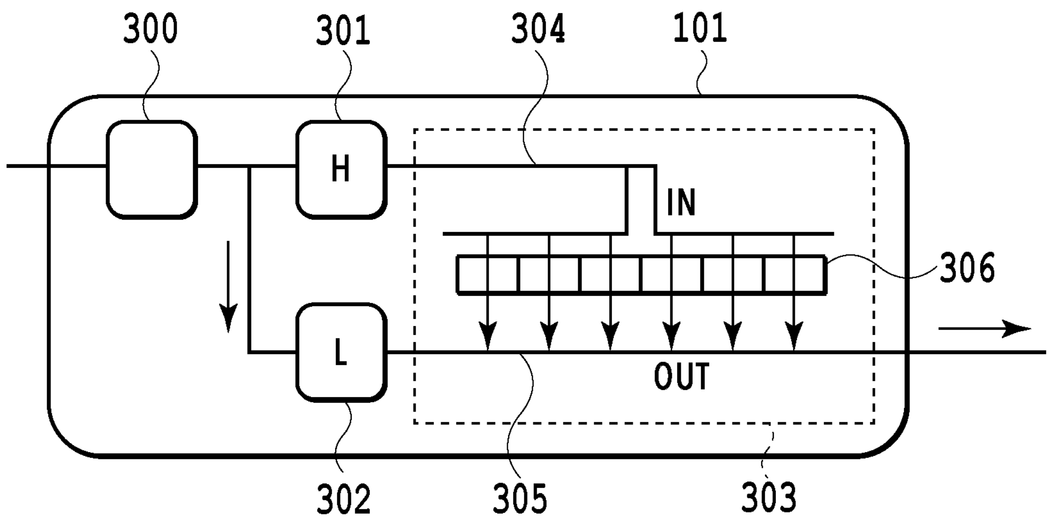
FIG. 3 is a diagram schematically illustrating a channel configuration in a head.

The collection channel 202 is a channel for collecting the ink from the print head 101 into the tank 102. A collection pump 207 is arranged in the middle of the collection channel 202. In the case where the ink is circulated in the circulation path, the collection pump 207 becomes a negative pressure generation source, and sucks the ink from the print head 101. The drive of the collection pump 207 generates an appropriate pressure difference between two channels (IN channel 304 and OUT channel 305; FIG. 3) in the print head 101, and the ink can be circulated between the IN channel 304 and the OUT channel 305.

An atmosphere communication valve may be provided in each of the supply channel 201 and the collection channel 202. Opening atmosphere communication valves 205 and 206 can eliminate a pressure difference generated in the circulation path.

A relief valve 211 that is a constant pressure valve is arranged in the middle of the relief channel 210. The relief valve 211 is opened and closed depending on pressure acting on itself. In the case where the relief valve 211 is opened, a channel including the relief channel 210 is formed. The ink supply amount to the print head 101 is thereby adjusted, and the pressure in the circulation channel can be stabilized.

The ink agitation unit 220 is provided inside the tank 102. The ink agitation unit 220 reduces the concentration unevenness due to precipitation by agitating the ink in the tank 102. The ink agitation unit 220 is formed of, for example, a propeller-shaped stirrer 212 arranged near a bottom portion of the inside of the tank 102, a shaft 213, a motor (not illustrated), and the like. The stirrer 212 is rotated by being driven by the motor from the outside of the tank 102 via the shaft 213.

Note that the ink agitation unit 220 is not limited to this example. Alternatively, there may be used an agitation unit using a magnetic stirrer in which a stirrer made of magnet is put into the ink and is rotated by magnetic force from the outside of the tank 102 to agitate the ink, an agitation unit in which the entire tank 102 including the ink is shook to agitate the ink in the tank 102, or the like.

The tank 102 may be provided with a sub-tank in addition to a main tank. The sub-tank stores the ink to be supplied to the main tank. In the case where the tank 102 includes multiple tanks such as the main tank and the sub-tank, the ink agitation unit 220 may be provided in each tank. Operations of the motor, the stirrer, and the like of the ink agitation unit 220 are controlled according to control signals from the control unit 500.

The tank 102 may be provided with an ink remaining amount sensor (not illustrated) that detects the level of the ink liquid surface. The ink remaining amount sensor is formed of, for example, multiple electrode pins. The control unit 500 can obtain the level of the ink liquid surface, that is the ink remaining amount of the tank 102 by detecting presence or absence of a conductive electrical current between the multiple pins.

Next, a channel configuration in the print head 101 is explained.

Figure 4A:
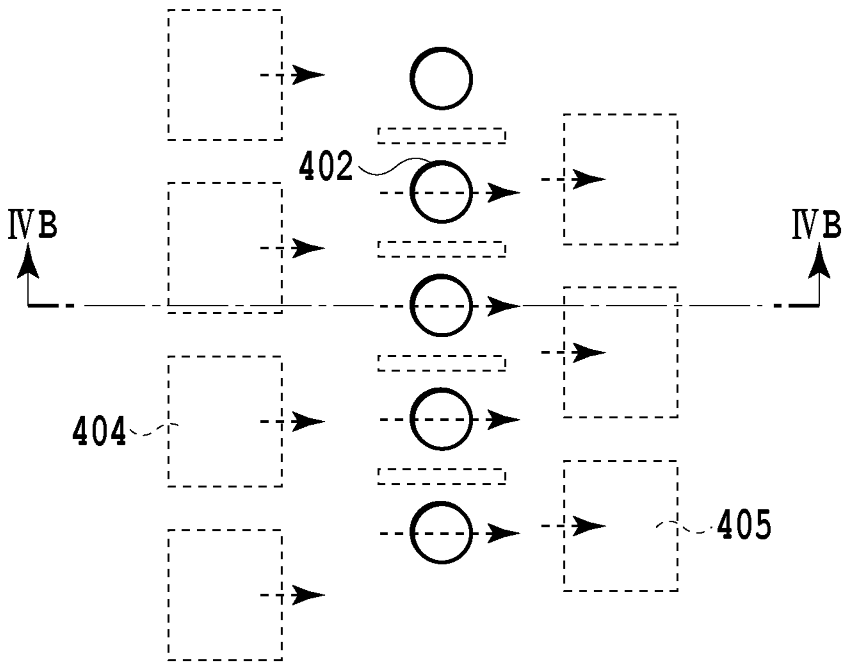
FIGS. 4A and 4B are diagrams explaining a flow of an ink in the head.
Figure 4B:
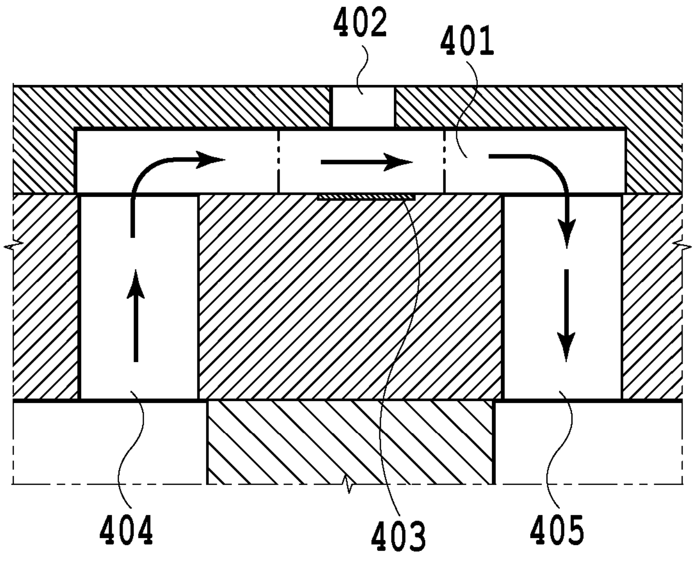

FIG. 3 is a diagram schematically illustrating the channel configuration in the print head 101. As illustrated in FIG. 3, a filter 300, a first negative pressure control unit 301, a second negative pressure control unit 302, a common supply channel (IN channel) 304, individual supply channels, individual collection channels, and a common collection channel (OUT channel) 305 are provided inside the print head 101. FIG. 4A is a plan schematic diagram in which part of a printing element substrate 306 is enlarged, and FIG. 4B is a cross-sectional schematic diagram along a cross-sectional line IVB-IVB in FIG. 4A.

The ink supplied from the supply channel 201 outside the print head 101 into the print head 101 passes the filter 300, and is then supplied to the first negative pressure control unit 301 and the second negative pressure control unit 302. The control pressure of the first negative pressure control unit 301 is set to, for example, −90 mmAq (1 mmAq=9.80665 Pa) that is weak negative pressure (negative pressure with a small pressure difference to the atmospheric pressure).

The control pressure of the second negative pressure control unit 302 is set to, for example, −180 mmAq that is strong negative pressure (negative pressure with a large pressure difference to the atmospheric pressure). These pressures in the first negative pressure control unit 301 and the second negative pressure control unit 302 are generated to be within appropriate ranges by drive of the ink circulation unit such as the collection pump 207.

In an ink ejection portion 303, multiple printing element substrates 306 in which multiple ejection ports are aligned are arranged, and an ejection port array is formed in the Z direction in FIG. 3. The common supply channel (IN channel) 304 for guiding the ink supplied by the first negative pressure control unit 301 and the common collection channel (OUT channel) 305 for guiding the ink supplied by the second negative pressure control unit 302 also extend in the arrangement direction of the printing element substrates 306.

Each printing element substrate 306 is provided with pressure chambers 401 that is filled with the ink and ejection ports 402 from which the ink is ejected. Printing elements 403 are provided at positions facing the ejection ports 402 in the pressure chambers 401.

Moreover, multiple individual supply channels 404 connected to the common supply channel (IN channel) 304 and multiple individual collection channels 405 connected to the common collection channel (OUT channel) 305 are formed in the printing element substrates 306 for the respective ejection ports 402. Accordingly, in each of the printing element substrates 306, there is generated a flow of ink in which the ink flows in from the common supply channel (IN channel) 304 where the negative pressure is relatively weak and flows out to the common collection channel (OUT channel) 305 where the negative pressure is relatively strong. The flow of ink occurs also in the ejection ports and the pressure chambers that are not performing printing. In the case where the ejection operation is performed in the printing element substrate 306, part of the ink moving from the common supply channel (IN channel) 304 to the common collection channel (OUT channel) 305 is ejected from the ejection ports 402, and is thereby consumed. The not-ejected ink moves to the collection channel 202 outside the print head 101 via the common collection channel 305.

The above-mentioned configuration generates the flow in which the ink flows in from the common supply channel 304 where the negative pressure is relatively weak (an absolute value of the pressure is high) and flows out to the common collection channel 305 where the negative pressure is relatively strong (an absolute value of the pressure is low) in the printing element substrate 306.

Based on the above configuration, the control unit 500 closes the atmosphere communication valves 205 and 206, opens the supply valve 204, and drives the supply pump 203 and the collection pump 207. This establishes the circulation path from the tank 102, to the supply channel 201, to the print head 101, to the collection channel 202, and to the tank 102. Moreover, in a halt period, the control unit 500 stops the supply pump 203 and the collection pump 207, and closes the supply valve 204. The flow of the ink in the print head 101 thereby stops.

The ink circulation can recover an ejection state of the ink in the print head 101. For example, in the case where the ejection failure of the ink occurs due to thickening of the ink near the ejection ports 402 caused by evaporation of water contents in the ink, the ejection state of the ink can be recovered to a normal state.

Moreover, in the ink in which the concentration unevenness due to precipitation tends to occur, the color material and the like deposited near the ejection ports 402 cause the ejection failure of the ink and color unevenness in an image. Also in such a case, the ink circulation can reduce the concentration unevenness to recover the ejection state of the ink to the normal state and achieve recovery from the color unevenness of the image. Accordingly, the ink circulation is one of recovery operations for maintaining not only the ejection state of the ink in the print head 101 but also uniformness of an image at a preferable state.

The above-mentioned ink circulation by the ink circulation unit 200 is executed in pre-return maintenance, first intermittent maintenance, and second intermittent maintenance to be described later in the case where the printing apparatus 100 is in a state where the print operation is halted, in addition to the case where the state of the printing apparatus 100 is a state where the print operation is executable. Moreover, for specific inks such as the white ink and the metallic ink in which the color materials tend to precipitate and inks in which color materials are dispersed such as disperse dyes for textile, the ink in the tank 102 is preferably agitated by the ink agitation unit 220 simultaneously with the ink circulation or before the ink circulation. Particularly, the precipitating color material can be homogenized by performing agitation near the bottom portion of the tank 102. The ink agitation may be executed simultaneously with the ink circulation or before the ink circulation also for general chromatic color inks (CMYK). Note that the agitation of the chromatic color inks is not essential.

Moreover, the ink circulation and the ink agitation are performed also in the case where a print instruction is manually inputted, in addition to maintenance planned in advance such as the pre-return maintenance, the first intermittent maintenance, and the second intermittent maintenance. The control unit 500 controls the ink circulation unit 200, and causes the ink circulation unit 200 to execute the ink circulation at predetermined timings. Moreover, the control unit 500 controls the ink agitation unit 220, and controls the ink agitation at predetermined timings. A start timing and an execution time period of each of the ink circulation and the ink agitation are determined by later-described processing (FIG. 6) executed by the control unit 500.

Next, a control configuration of the printing apparatus 100 according to the present embodiment is explained.

FIG. 5 is a block diagram illustrating a control configuration of the printing apparatus 100. The printing apparatus 100 includes the control unit 500, an image processing controller 507, an operation panel 506, a sensor 519, and the like. Moreover, the printing apparatus 100 includes the head driver 518 that drives the print head 101 and drive circuits 511 to 517 for driving drive units of motors, actuators, pumps, and the like included in the units of the printing apparatus 100. The head driver 518 and the drive circuits 511 to 517 are connected to the control unit 500.

The control unit (print controller 500) includes a CPU 501, a ROM 502, a RAM 503, a storage device 504, an I/F 505, and the like. The ROM 502, the RAM 503, the storage device 504, and the I/F 505 are connected to the CPU 501 via a bus 508. The CPU 501 is a processor that integrally controls the units of the printing apparatus 100.

The CPU 501 invokes a program stored in the ROM 502, the storage device 504, or the like to load the program to a work area of the RAM 503, and executes the program. The ROM 502 is a memory that permanently holds a boot program, a program of BIOS or the like, data, and the like. The RAM 503 is a volatile or non-volatile memory, temporarily holds the program loaded from the storage device 504, the ROM 502, or the like, and includes a work area used by the control unit 500 to perform various processes to be described later.

The storage device 504 is a storage device such as an HDD, an SSD, or a flash memory, and holds programs to be executed by the CPU 501, data necessary for execution of the programs, various parameters, setting information, job data, and the like.

The programs include a program for causing the CPU 501 to execute processing according to the method of the present disclosure. The CPU 501 implements functions of the present disclosure by executing processing to be described later according to the program. The functions are described later.

The I/F 505 includes interfaces such as USB and LAN. The control unit 500 is connected to and communicates with a host apparatus 530 via the I/F 505.

Moreover, the control unit 500 is connected to the operation panel 506, the head driver 518, the sensor 519, and the like via the I/F 505. The drive circuits 511 to 517 for driving the conveyance unit 105, a head carriage unit 521, the drying unit 103, a maintenance unit 520, the ink circulation unit 200, and the ink agitation unit 220 are connected to the control unit 500 via the I/F 505. The maintenance unit 520 is a configuration relating to maintenance of the print head 101, and includes, for example, a cap suction unit 522, a wiping unit 523, and the like.

The CPU 501 controls the units connected to the control unit 500 according to the programs and various parameters stored in the ROM 502 or the storage device 504. In the case where the CPU 501 receives various commands, the image data, setting information inputted by the user, and the like from the host apparatus 530 via the I/F 505, the CPU 501 temporality stores the various commands, the image data, the setting information, and the like in the RAM 503.

The printing apparatus 100 of the present embodiment is provided with the halt period in which the ink circulation is halted. A halt time period that is a duration of the halt period or a return time that is a time at which the halt period ends and the printing apparatus 100 returns from the halt period is a value set by the user by using a return timer to be described later. Setting information of the return timer transmitted from the host apparatus 530 includes the return time or the halt time period. A specific setting method of the return time or the halt time period is described later.

The image processing controller 507 is hardware capable of executing image processing at a higher speed than the CPU 501. The image processing controller 507 is activated in the case where the CPU 501 writes parameters and data necessary for the image processing into a predetermined address of the RAM 503. The image processing controller 507 reads the above-mentioned parameters and data, and then executes predetermined image processing on the above-mentioned data. Note that the image processing controller 507 is not an essential constituent element, and similar processing can be executed also by the CPU 501.

The operation panel 506 includes, for example, a display unit formed of a liquid crystal display or the like and an input unit formed of a touch panel, various keys, or the like. The display unit displays a current status of the printing apparatus 100 and the setting information inputted from the CPU 501. The input unit inputs information inputted by an operation of the user, into the CPU 501. For example, a print start instruction, various pieces of setting information, and the like are inputted.

Note that the host apparatus 530 may function as an operation unit of the printing apparatus 100, instead of the operation panel 506. In this case, the current status of the printing apparatus 100, the setting information, and the like are sent from the CPU 501 to the host apparatus 530, and displayed on the host apparatus 530. Moreover, the print start instruction, the various pieces of setting information, and the like are inputted by the user of the host apparatus 530, and are inputted into the CPU 501.

The sensor 519 includes the sensor that detects the amount of ink remaining in the tank, a sensor that detects a conveyance position of the sheet, and the like.

Next, a functional configuration of the printing apparatus 100 according to the present embodiment is explained.

Figure 6:
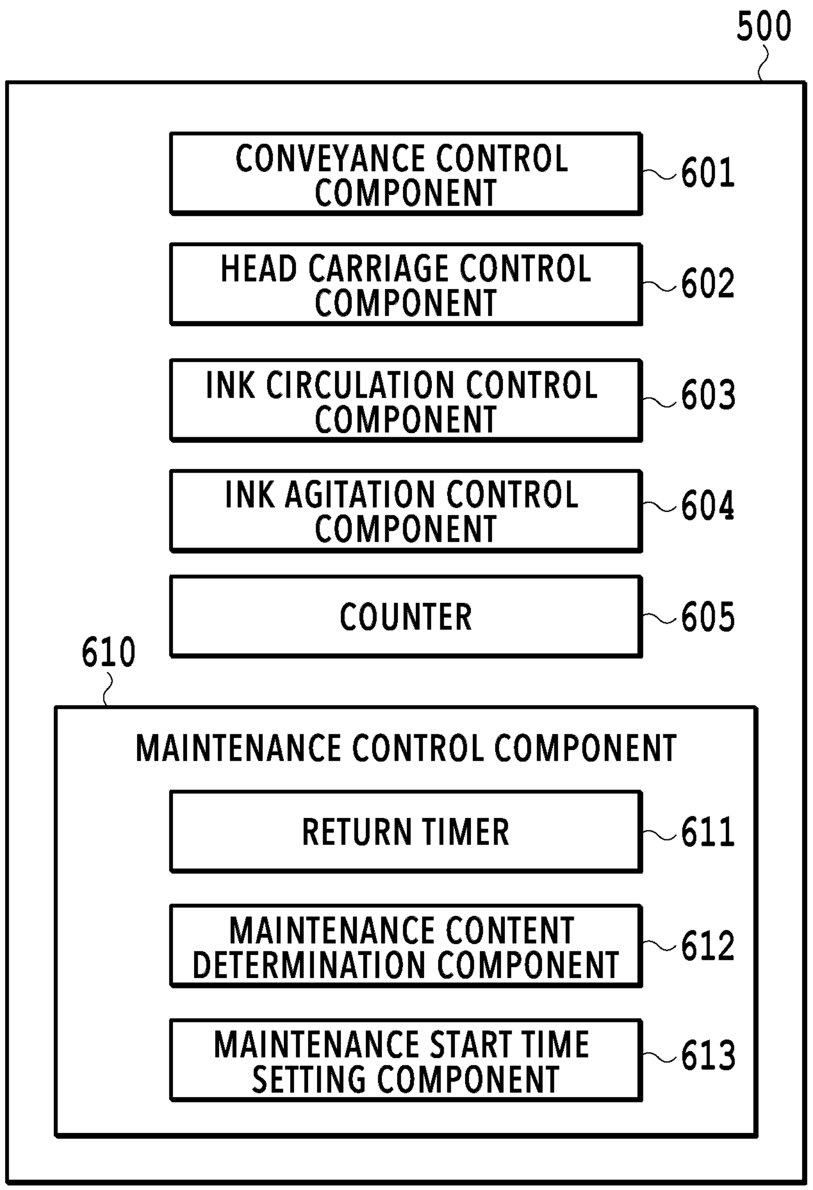
FIG. 6 is a block diagram illustrating a functional configuration of the inkjet printing apparatus.

FIG. 6 is a block diagram illustrating a functional configuration of the printing apparatus 100. The control unit 500 of the printing apparatus 100 includes a conveyance control component 601, a head carriage control component 602, an ink circulation control component 603, an ink agitation control component 604, a counter 605, a maintenance control component 610, and the like. The maintenance control component 610 includes a return timer 611, a maintenance content determination component 612, a maintenance start time setting component 613, and the like. In the present embodiment, the CPU 501 implements these functional components by invoking a program stored in the ROM 502 or the storage device 504 and executing processing according to the program.

The conveyance control component 601 drives the conveyance motor of the conveyance unit 105, and controls conveyance and stop of the sheet P. The head driver 518 causes the ink to be ejected from the print head 101 according to the print data transmitted from the control unit 500, in conjunction with the conveyance operation of the sheet.

The head carriage control component 602 performs control to change the position and orientation of the head carriage unit 521 on which the print head 101 is mounted, depending on an operation state of the printing apparatus 100. The operation state includes a printing state, a maintenance state, a capped state, and the like.

In the case where the operation state transitions from the maintenance state to the printing state, the head carriage control component 602 moves the position of the print head 101 in an up-down direction (Y direction), to a print position. Moreover, in the case where the operation state transitions from the printing state to the maintenance state or the capped state, the head carriage control component 602 moves the position of the print head 101 in the up-down direction, to a predetermined maintenance position or capping position. Note that, in the maintenance state or the capped state, the head carriage control component 602 changes the positions of the print head 101 and the maintenance unit 520 relative to each other in a horizontal direction such that the maintenance unit 520 or a head cap is arranged below the print head 101.

Regarding the orientation of the print head 101, in the case where the operation state transitions to the printing state, the head carriage control component 602 adjusts and fixes the angle of the print head 101 such that the ink ejection surface of the print head 101 faces the printing surface of the sheet P while being parallel to the printing surface. In the case where a roll sheet is used, a sheet surface is often maintained in a curved state to maintain tension of the sheet. Accordingly, the orientation of the print head 101 of each color is adjusted and fixed such that the ink ejection surface faces the printing surface of the sheet P while being parallel to the printing surface.

The ink circulation control component 603 controls the ink circulation unit 200 such that pressure of the ink supplied to the print head 101 falls within an appropriate range during the print operation. Moreover, the ink circulation control component 603 circulates the ink also in the halt period of the print operation by controlling the ink circulation unit 200 at a schedule set by the maintenance control component 610. For example, the ink circulation is executed in the pre-return maintenance, the first intermittent maintenance, and the second intermittent maintenance to be described later. Note that the first intermittent maintenance and the second intermittent maintenance includes a non-operation time period in which the ink circulation is halted.

The ink agitation control component 604 agitates the ink in the tank 102 by controlling the ink agitation unit 220 according at a schedule set by the maintenance control component 610. For example, the ink agitation in the tank is executed in the pre-return maintenance, the first intermittent maintenance, and the second intermittent maintenance to be described later. Note that the first intermittent maintenance and the second intermittent maintenance includes a non-operation time period in which the ink agitation is halted.

The counter 605 is a real-time clock or the like, and manages time periods and times. The time periods and times to be managed include a start time and an end time of the maintenance, a start time and an end time (return time) of the halt period, a time at which an instruction is inputted, and the like. Moreover, start times and stop times of the ink circulation and the ink agitation are timed by the counter 605, and are held in the RAM 503 as a log.

The maintenance control component 610 controls the maintenance operation for the ink including the ink circulation by the ink circulation unit 200 and the in-tank ink agitation (hereinafter, referred to as ink agitation) using the ink agitation unit 220. Moreover, the maintenance control component 610 controls the maintenance operation for the print head 101 using the maintenance unit 520.

The maintenance operation for the print head 101 includes suction of the ink in the nozzles by the cap suction unit 522 and wiping of the nozzle surface by the wiping unit 523. The cap suction unit 522 discharges the ink and the foreign substance in the nozzles by sealing the ink ejection surface (nozzle surface) of the print head 101 with a cap and reducing the pressure in the cap. The wiping unit 523 includes a suction wiping unit and a blade wiping unit. The suction wiping unit includes a suction port with a smaller length than the nozzle array of the print head 101, and discharges the ink and the foreign substance in the nozzles by moving the suction port in the direction in which the nozzles are aligned, in a state where negative pressure is applied. The blade wiping unit removes the ink and the foreign substance on the nozzle surface by wiping the nozzle surface with a rubber blade with no suction unit.

The maintenance control component 610 controls the maintenance operation of the printing apparatus 100. In the present embodiment, the maintenance control component 610 performs control such that the pre-return maintenance is completed before the time of return from the halt period. In the pre-return maintenance, the maintenance control component 610 executes the ink circulation by controlling the ink circulation unit 200, and executes the ink agitation in the tank 102 by controlling the ink agitation unit 220. The ink circulation circulates the ink in the print head 101, the tank 102, the channels, and the like, and reduces the concentration unevenness. The ink agitation agitates the ink in the tank 102, and reduces the concentration unevenness.

The maintenance control component 610 includes the return timer 611, the maintenance content determination component 612, and the maintenance start time setting component 613 as functions for controlling the maintenance during the halt period.

The return timer 611 is a timer used by the user to set the return time from a halt state that is a state where the print operation is halted to a standby state (or the printing state) that is a state where the print operation can be executed or the halt time period that is a time duration in the halt state (halt period). In the case where the time and date are set in the return timer 611, the maintenance control component 610 sets the set time and date as the return time. In the case where the halt time period is set in the return timer 611, the maintenance control component 610 sets a time at which the set halt time period elapses from the start time of the halt period, as the return time.

The user can set the return time to any time by, for example, specifying a time for each day of week or specifying specific time and date (for example, 9 AM on Mondays, Tuesdays, Wednesdays, Thursdays, and Fridays, or 9 AM on Apr. 1, 2023). Moreover, the user can set the halt time period to any time duration such as, for example, five hours, five days, or five weeks. In the present embodiment, the setting of the return time or the halt time period is referred to as setting of the return timer.

Figure 7A:
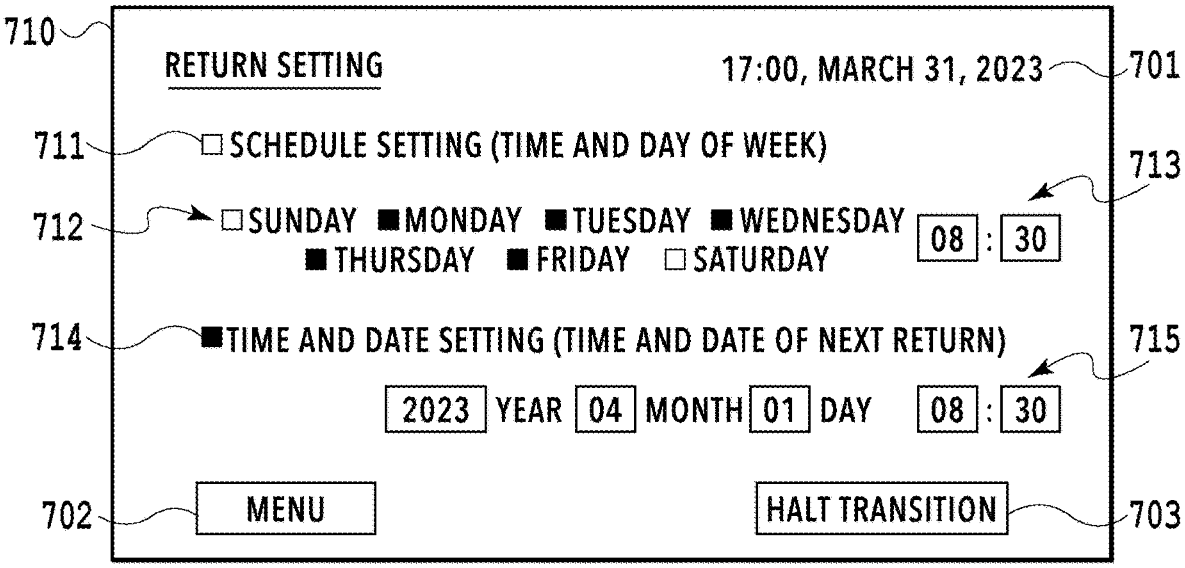
FIGS. 7A and 7B are diagrams illustrating setting examples of a return timer.
Figure 7B:
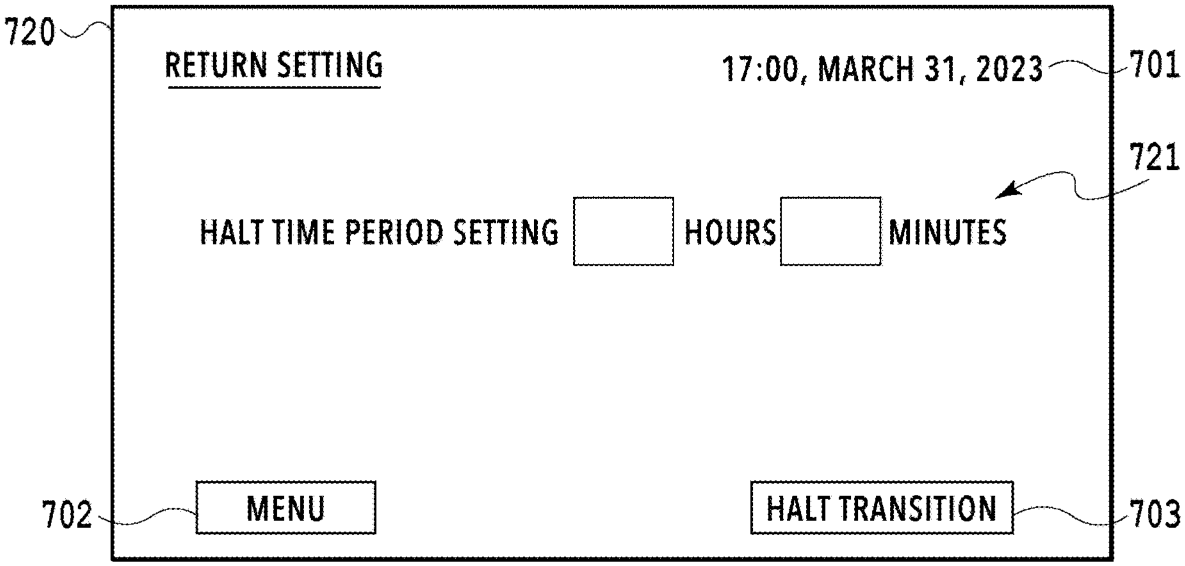

FIGS. 7A and 7B are diagrams illustrating examples of setting screens of the return timer. FIG. 7A is an example of a setting screen 710 that receives setting of the return time. FIG. 7B is an example of a setting screen 720 that receives setting of the halt time period. In the case where a setting request of the return timer is inputted from the host apparatus 530 into the printing apparatus 100, the control unit 500 sends the setting screen 710 illustrated in FIG. 7A or the setting screen 720 illustrated in FIG. 7B to the host apparatus 530, and causes the host apparatus 530 to display the setting screen 710 or 720. In the case where a setting value inputted into the setting screen 710 or 720 by the user of the host apparatus 530 is sent to the printing apparatus 100, the control unit 500 receives the setting value, and holds the received setting value in the RAM 503 as the setting value of the return timer.

The setting screen 710 is provided with a schedule setting field 711 for setting the time and the day of week at which the printing apparatus 100 is to return from the halt period and a time-and-date setting field 714 for setting specific time and date (next return time and date) at which the printing apparatus 100 is to return from the halt period. The schedule setting field 711 is provided with a check field 712 for each day of week and a time input field 713, and the time inputted into the time input field 713 is effective for days of week that are checked. In the example of FIG. 7A, Mondays, Tuesdays, Wednesdays, Thursdays, and Fridays are checked, and 8:30 is inputted. Accordingly, 8:30 on Mondays, Tuesdays, Wednesdays, Thursdays, and Fridays are set as the return time in the return timer. A time display 701 of the setting screen 710 displays the current time and date. In the case where a menu button 702 is operated, the screen transitions to a menu screen. In the case where a halt transition button 703 is operated, the printing apparatus 100 transitions to the halt state after execution of processing illustrated in FIG. 9.

The setting screen 720 is provided with a halt time period setting field 721 for setting the halt time period, the menu button 702, and the halt transition button 703. The time display 701 of the setting screen 720 displays the current time and date. In the case where the halt transition button 703 is operated in the state where a time duration is inputted in the halt time period setting field 721, the return time is set in the return timer such that the printing apparatus 100 returns from the halt state at a time at which the set halt time period elapses. Then, the halt period starts. Note that the halt time period setting field 721 may be provided in the setting screen 710 illustrated in FIG. 7A.

As described above, the maintenance control component 610 executes the pre-return maintenance including the ink circulation and the ink agitation such that the pre-return maintenance is completed before the return time set by the return timer 611. A maintenance start time setting component (hereinafter, referred to as start time setting component 613) sets the start time of the pre-return maintenance to this end. Hereinafter, the return time is expressed as $t_e$, and the start time of the pre-return maintenance is expressed as $t_s$.

The start time setting component 613 sets a time going back from the return time $t_e$ by at least a time period required for the pre-return maintenance, as the start time $t_s$ of the pre-return maintenance. The maintenance control component 610 performs control such that the pre-return maintenance is started in the case where the start time $t_s$ set by the start time setting component 613 comes.

The setting of the return time $t_e$ or the halt time period $T_d$ by the user (setting of the return timer 611) is performed before the transition to the halt period, and the maintenance control component 610 preferably obtains the return time before the transition to the halt period. In the case where the setting of the return timer 611 is performed before the transition to the halt period, the maintenance control component 610 sets the start time $t_s$ of the pre-return maintenance before the transition to the halt period based on the return time $t_e$ or the halt time period $T_d$ set in the return timer 611. Note that the pre-return maintenance is a preparation operation before start of the print operation, and is thus preferably performed at a time close to the return time. More preferably, the pre-return maintenance is executed immediately before the return time.

Moreover, the maintenance content determination component 612 (hereinafter, referred to as determination component 612) of the maintenance control component 610 determines processing contents of the pre-return maintenance based on an abandoned time period $T_c$. The abandoned time period $T_c$ is a time duration in which no ink circulation is performed. Specifically, the abandoned time period $T_c$ is a time period from an end time of the ink circulation lastly executed before the transition to the halt period to the return time $t_e$.

FIG. 8 is a diagram illustrating an example of a table 800 in which the contents of maintenance are determined in advance depending on the abandoned time period $T_c$. Note that the example of FIG. 8 illustrates a case where the ink agitation unit 220 is mounted only in the tanks 102 of the white (W) and metallic inks, and is not mounted in the tanks 102 of the chromatic color inks (C, M, Y, and K).

In the case where the abandoned time period $T_c$ is equal to or more than zero hours and is less than three hours, the ink circulation and the ink agitation are each executed for 15 minutes for the white and metallic inks. No ink circulation or the ink agitation is performed for the chromatic color inks.

In the case where the abandoned time period $T_c$ is equal to or more than three hours and is less than six hours, the ink circulation and the ink agitation are each executed for 30 minutes for the white and metallic inks. The ink circulation is executed for 15 minutes for the chromatic color inks.

In the case where the abandoned time period $T_c$ is equal to or more than six hours and is less than 11 hours, the ink circulation and the ink agitation are each executed for 45 minutes for the white and metallic inks. The ink circulation is executed for 15 minutes for the chromatic color inks.

In the case where the abandoned time period $T_c$ is equal to or more than 11 hours, the ink circulation and the ink agitation are each executed for 60 minutes for the white and metallic inks, and the nozzle blade wiping and the nozzle suction wiping are further executed to clean the nozzles of the print head 101. For the chromatic color inks, the ink circulation is executed for 30 minutes, and the nozzle blade wiping and the nozzle suction wiping are further executed.

Note that, in the example of FIG. 8, the processing contents set for the case of the chromatic color inks vary from that for the case of the white and metallic inks. An operation time period of the ink circulation for the chromatic color inks is set to be equal to or less than an operation time period of the ink circulation for the white and metallic inks. This is because a degree at which the ink circulation and the ink agitation in the tank can reduce the concentration unevenness varies depending on the type of the ink. For example, in predetermined types of inks in which specific gravities of color materials are high such as a white ink that contains a white pigment such as titanium oxide and a metallic ink that contains a metal pigment such as aluminum, precipitation tends to occur. Accordingly, the ink circulation and the ink agitation in the tank take more time to reduce the concentration unevenness in the white and metallic inks than in the general chromatic color inks (C, M, Y, and K).

Moreover, the ink circulation and the ink agitation may be simultaneously started, or the ink agitation may be executed before the ink circulation. Furthermore, in the case where the ink agitation unit 220 is provided in each of the tanks 102 for the chromatic color inks, the ink agitation may be performed in addition to the ink circulation. Moreover, information illustrated in the table 800 may be information set in advance and stored in the RAM 503 or the ROM 502, or may be settable by the user. The relationships between the abandoned time period $T_c$ and the processing contents illustrated in FIG. 8 are merely examples, and the present disclosure is not limited to these examples. Any processing contents may be set for any abandoned time period $T_c$.

The determination component 612 refers to the table 800 illustrated in FIG. 8 in the case where the determination component 612 determines the processing contents of maintenance.

Moreover, the maintenance control component 610 may cause the ink circulation and the ink agitation to be intermittently executed at predetermined time intervals during the halt period.

For example, in the case where the setting of the return timer 611, that is the setting of the return time $t_e$ is not performed before the transition to the halt period, the maintenance control component 610 performs control such that the first intermittent maintenance is executed during the halt period. The first intermittent maintenance is maintenance processing in which the ink circulation unit 200 and the ink agitation unit 220 are made to intermittently operate at predetermined time intervals. The first intermittent maintenance includes the ink circulation and the ink agitation.

Meanwhile, in the case where the setting of the return timer 611, that is the setting of the return time $t_e$ is performed before the transition to the halt period and the abandoned time period $T_c$ is equal to or more than a threshold $T_h$, the maintenance control component 610 performs control such that the second intermittent maintenance is executed. The second intermittent maintenance is maintenance processing intermittently performed by the ink circulation unit 200 and the ink agitation unit 220 at predetermined time intervals in a period from a transition time $t_a$ to the halt period to the start time $t_s$ of the pre-return maintenance. The second intermittent maintenance includes the ink circulation and the ink agitation. The details of the first and second intermittent maintenance are described later.

Moreover, in the case where the setting of the return timer 611, that is the setting of the return time $t_e$ is performed before the transition to the halt period and the abandoned time period $T_c$ is less than a threshold $T_h$, the maintenance control component 610 may perform no second intermittent maintenance, and perform only the pre-return maintenance. This is due to the following reason. In the case where the abandoned time period $T_c$ is a short time period, the precipitation and the concentration unevenness occur at small degrees. Accordingly, the operation time period of the ink circulation unit 200 such as a pump is reduced to prioritize suppression of wearing of the pump or the like. A replacement frequency of parts such as the pump is reduced, and an improvement in productivity can be expected.

A time period to be set as the threshold $T_h$ of the abandoned time period $T_c$ for determining whether the second intermittent maintenance is to be executed or not is preferably shorter than a time period in which precipitation and sedimentation of the ink causes an ink circulation failure or an ink agitation failure and a failure occurs in the printing apparatus 100. Specific examples of the failure include, for example, an ejection failure of the ink due to blocking of nozzle channels. Moreover, the specific examples include blurring caused by insufficient refill due to an effect of a blocking object and the like. This blurring tends to occur mainly in the case where a print duty is high. Moreover, in the case where a sufficient time period for the pre-return maintenance cannot be secured, the concentration unevenness may occur even without the blocking.

A risk of occurrence of these failures varies greatly depending on an ink composition, and recovery from these failures is possible in some cases by taking sufficient time for the pre-return maintenance. Specifically, in the case of the white ink containing titanium oxide, maintenance of several hours is necessary for recovery in the case where the circulation and the agitation are stopped for one week. Meanwhile, in order to achieve recovery by maintenance of one hour or less, it is preferable to perform control such that the circulation and the agitation are executed at intervals of 24 hours as a guide.

Moreover, the printing apparatus 100 may receive an input of a return instruction manually performed by the user during the halt period. In the case where the return instruction is manually inputted by the user during the halt period, the maintenance control component 610 immediately starts the pre-return maintenance.

In the case where the return is manually instructed before the return time $t_e$ during the halt period as described above, the user needs to wait until completion of the pre-return maintenance that is performed after the return instruction to the print operation possible state. Accordingly, in the determination of the processing contents of the maintenance and the threshold $T_h$, it is preferable to consider the allowable waiting time period in addition to the productivity affected by the wear of the pump and the above-mentioned relationship between the abandoned time period $T_c$ and the time period for recovery. For example, in the case where the allowable waiting time period is set to one hour at maximum, the operation time period and the non-operation time period of the first and second intermittent maintenance are preferably set such that the state of the ink can be recovered by the pre-return maintenance of one hour.

Moreover, the determination component 612 preferably determines the processing contents of the pre-return maintenance based on a time period (hereinafter, referred to as elapsed time period $T_f$) between the time at which the return to the print operation possible state is instructed and the end time of the ink circulation lastly executed before this time.

Furthermore, the processing contents of the pre-return maintenance may include the maintenance of the print head 101 by the cap suction unit 522 and the wiping unit 523.

In the above-mentioned first intermittent maintenance, the ink circulation and the ink agitation are repeatedly, intermittently executed at predetermined time intervals. Specifically, operation and non-operation of the ink circulation and the ink agitation are alternately repeated. Similarly, in the above-mentioned second intermittent maintenance, the ink circulation and the ink agitation are repeatedly, intermittently executed at predetermined time intervals. Specifically, operation and non-operation of the ink circulation and the ink agitation are alternately repeated.

Note that a relationship between a ratio X1 of the operation time period to the non-operation time period of the ink circulation unit 200 in the first intermittent maintenance and a ratio Y1 of the operation time period to the non-operation time period of the ink circulation unit 200 in the second intermittent maintenance is preferably X1≥Y1. Note that X1 is assumed to be a ratio of one operation time period to one non-operation time period in one of multiple times of intermittent operation included in the first intermittent maintenance. Similarly, Y1 is assumed to be a ratio of one operation time period to one non-operation time period in one of multiple times of intermittent operation included in the second intermittent maintenance.

Moreover, a relationship between a ratio X2 of the operation time period to the non-operation time period of the ink agitation unit 220 in the first intermittent maintenance and a ratio Y2 of the operation time period to the non-operation time period of the ink agitation unit 220 in the second intermittent maintenance preferably satisfies X2≥Y2. Note that X2 is assumed to be a ratio of one operation time period to one non-operation time period in one of multiple times of intermittent operation included in the first intermittent maintenance. Similarly, Y2 is assumed to be a ratio of one operation time period to one non-operation time period in one of multiple times of intermittent operation included in the second intermittent maintenance.

This configuration is adopted to reduce the time period of the pre-return maintenance that is performed in the case where the return timer is not set and that is started after the user manually performs the return instruction, that is the waiting time period of the user. Making the ratio of the operation time period of the ink circulation or the ink agitation in the first intermittent maintenance executed in the case where the return timer is not set larger than the ratio in the second intermittent maintenance like X1≥Y1 or X2≥Y2 can reduce the time period required for the pre-return maintenance. This can reduce the waiting time period of the user after the input of the return instruction.

A relationship between an operation time period A1 of the ink circulation in the pre-return maintenance and an operation time period B1 of the ink circulation in the second intermittent maintenance is preferably A1≤B1. Note that B1 is assumed to be one operation time period in one of multiple times of intermittent operation included in the second intermittent maintenance.

Moreover, a relationship between an operation time period A2 of the ink agitation in the pre-return maintenance and an operation time period B2 of the ink agitation in the second intermittent maintenance is preferably A2≤B2. Note that B2 is assumed to be one operation time period in one of multiple times of intermittent operation included in the second intermittent maintenance.

This configuration is adopted to reduce the time period of the pre-return maintenance that is started after the user manually performs the return instruction before the start time $t_s$ of the expected pre-return maintenance, that is the waiting time period of the user as much as possible. Setting the operation time period in the second intermittent maintenance executed in the case where the abandoned time period $T_c$ is long longer than the operation time period in the pre-return maintenance like A1≤B1 or A2≤B2 can reduce the time period required for the pre-return maintenance. This can reduce the waiting time period of the user after the input of the return instruction.

Furthermore, the ink agitation in the pre-return maintenance, the first intermittent maintenance, and the second intermittent maintenance is preferably started simultaneously with the ink circulation or before the ink circulation.

Moreover, a relationship between the ratio X1 of the operation time period to the non-operation time period of the ink circulation in the first intermittent maintenance and the ratio X2 of the operation time period to the non-operation time period of the ink agitation in the first intermittent maintenance is preferably set to satisfy X1≤X2. This configuration is adopted to suppress the case where the ink in the tank 102 whose concentration has increased due to precipitation blocks fine structures inside the print head 101.

Furthermore, in the first intermittent maintenance or the second intermittent maintenance, control is preferably performed such that no ink is ejected from the print head 101. This is to suppress an increase of an ink usage amount due to ink ejection by reducing the ink concentration unevenness in the print head 101 by the ink circulation.

Next, relationships between the maintenance operation and presence or absence of the setting of the return timer are explained.

Figure 9:
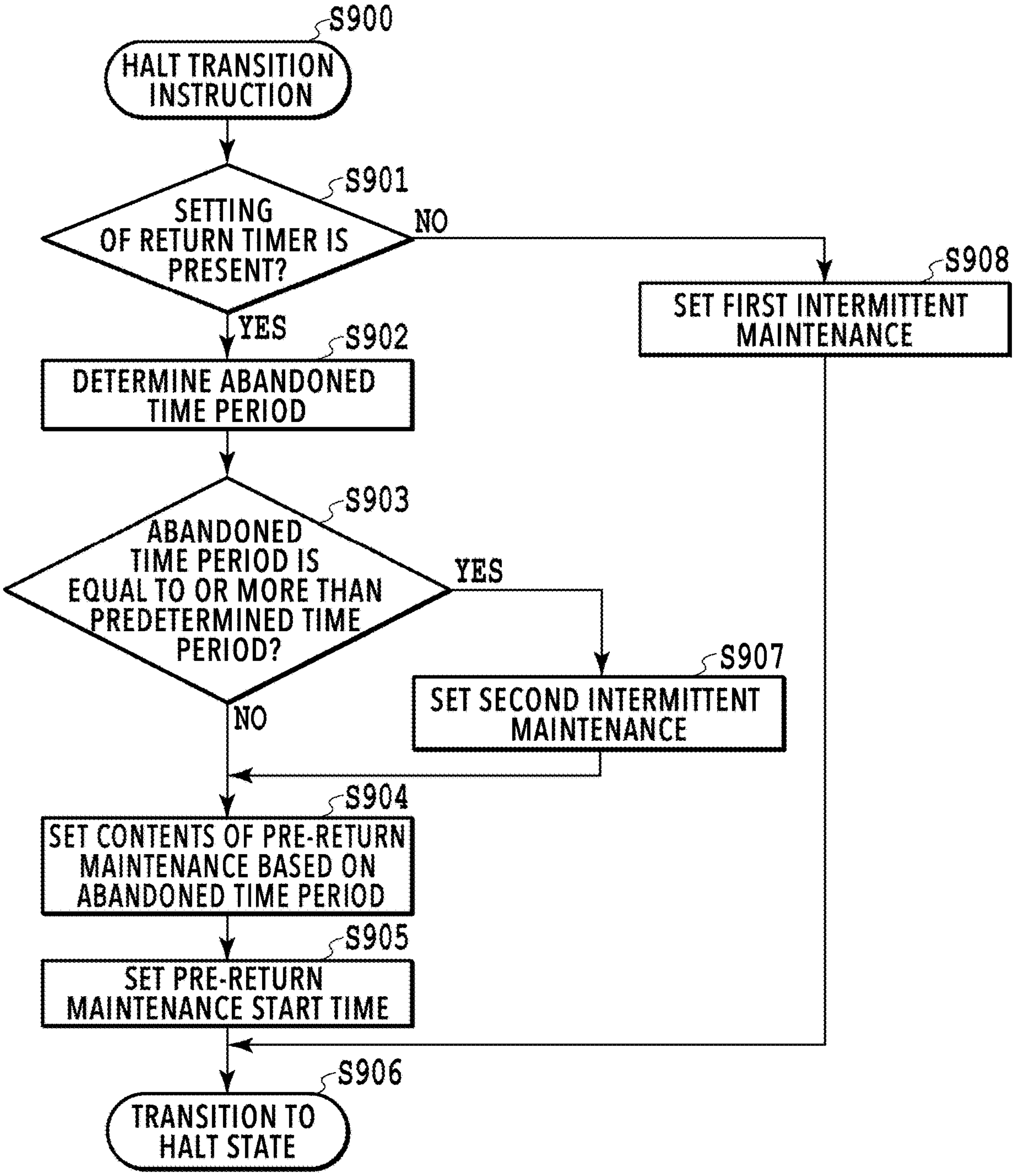
FIG. 9 is a flowchart illustrating a flow of processing executed in the case where a halt transition instruction is received.

FIG. 9 is a flowchart illustrating a flow of processing executed in the case where the printing apparatus 100 receives a halt transition instruction. The processing illustrated in the present flowchart is described in a program stored in the ROM 502 or the storage device 504 of the printing apparatus 100. The program is invoked by the CPU 501, loaded onto the RAM 503, and is executed. In the case where the printing apparatus 100 receives the halt transition instruction from the host apparatus 530 or the operation panel 506 (S900), the CPU 501 starts the processing illustrated in the present flowchart. In the following explanation, sign "S" represents step.

In S901, the CPU 501 checks whether or not the user has set the return timer 611. In the case where the return timer 611 is set, the processing proceeds to S902. In the case where the return timer 611 is not set, the processing proceeds to S908.

In S902, the CPU 501 determines the abandoned time period $T_c$. The abandoned time period $T_c$ is a time duration from the end time of the ink circulation lastly performed before the reception of the halt transition instruction to the return time $t_e$ set by the return timer 611.

In S903, the CPU 501 determines whether or not the abandoned time period $T_c$ is equal to or more than the predetermined time period (threshold $T_h$). In the case where the abandoned time period $T_c$ is shorter than the predetermined time period (threshold $T_h$), the processing proceeds to S904.

In S904, the CPU 501 sets the processing contents of the pre-return maintenance based on the abandoned time period $T_c$ determined in S902. For example, the processing contents of the pre-return maintenance for the abandoned time period $T_c$ are assumed to be set in advance in the table 800 illustrated in FIG. 8 and stored in the RAM 503 or the ROM 502. The CPU 501 determines the contents of the pre-return maintenance depending on the abandoned time period $T_c$.

In S905, the CPU 501 sets the time going back from the set return time $t_e$ by the time period required for the pre-return maintenance, as the start time $t_s$ of the pre-return maintenance. Then, the processing proceeds to S906, and the printing apparatus 100 transitions to the halt state.

In the case where the CPU 501 determines that the abandoned time period $T_c$ is equal to or more than the predetermined time period (threshold $T_h$) in S903, the processing proceeds to S907.

In S907, the CPU 501 performs setting such that the second intermittent maintenance is executed after the halt transition, and then executes the processes of S904 to S906. The time intervals and processing contents of the second intermittent maintenance may be set in advance, or determined depending on the abandoned time period $T_c$. Alternatively, the time intervals and processing contents may be determined depending on the allowable waiting time period of the user.

In the case where the CPU 501 determines that the return timer 611 is not set in S901, the processing proceeds to S908.

In S908, the CPU 501 performs setting such that the first intermittent maintenance is executed after the halt transition. Then, the processing proceeds to S906, and the printing apparatus 100 transitions to the halt state. The time intervals and processing contents of the first intermittent maintenance may be set in advance, or determined depending on the allowable waiting time period of the user.

A specific example of the maintenance operation depending on the setting of the return timer 611 is explained.

Figure 10:
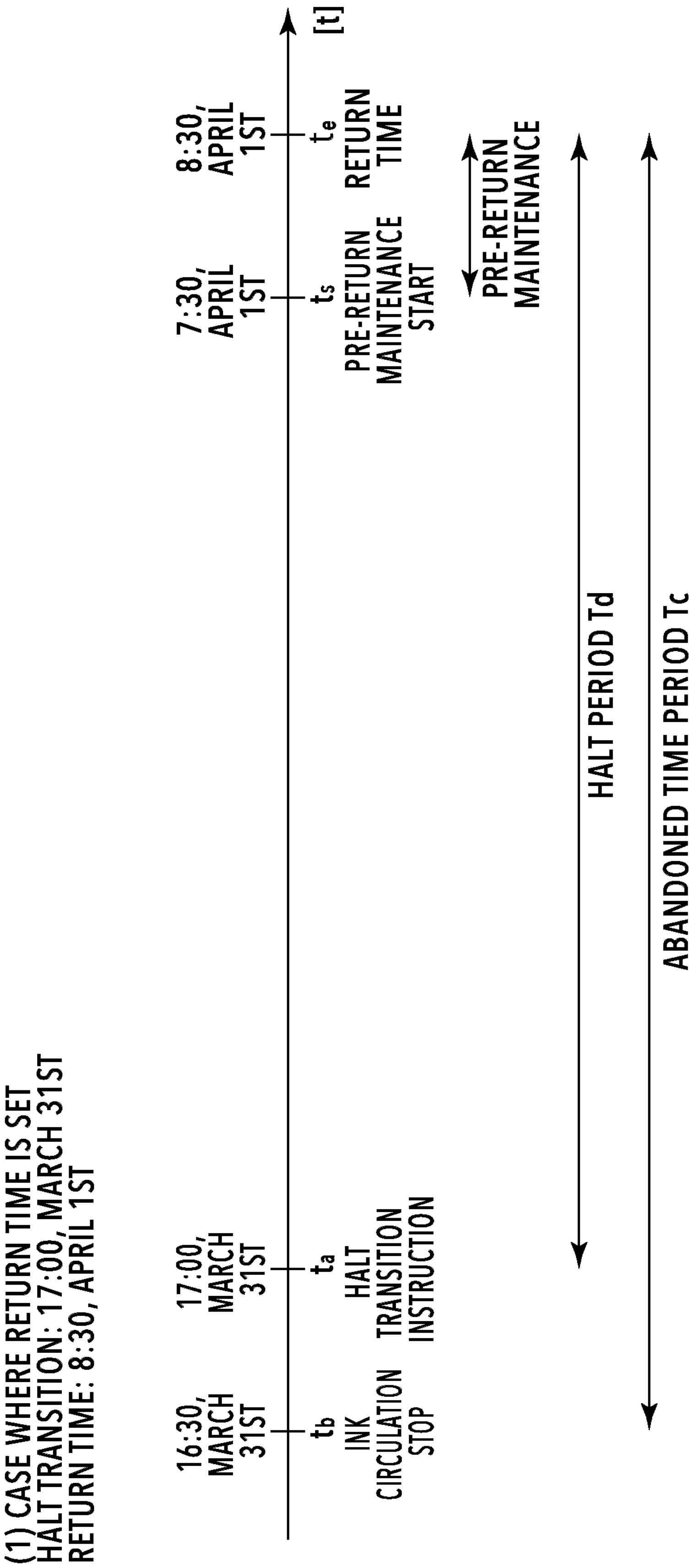
FIG. 10 is a diagram illustrating a maintenance example in the case where a return time is set in the return timer.

FIG. 10 is an example (1) of the case where the return time $t_e$ is set in the return timer 611. The rightward arrow in FIG. 10 illustrates a time axis [t]. The time at which the halt transition instruction is inputted into the control unit 500 is illustrated as $t_a$, the end time (ink circulation stop time) of the last ink circulation before the halt transition is illustrated as $t_b$, the start time of the pre-return maintenance is illustrated as $t_s$, and the return time is illustrated as $t_e$. Moreover, the halt period is illustrated as $T_d$, and the abandoned time period is illustrated as $T_c$. The threshold $T_h$ for determining whether or not the second intermittent maintenance is to be set is assumed to be 20 hours.

In the example of FIG. 10, the halt transition instruction is inputted at "17:00, March 31st" (time $t_a$), and the return time $t_e$ is set to "8:30, April 1st" in the return timer 611. Note that the ink circulation stop time to is assumed to be "16:30, March 31st".

The CPU 501 determines the abandoned time period $T_c$ from the ink circulation stop time $t_b$ (16:30, March 31st) and the return time $t_e$ (8:30, April 1st). As a result, the abandoned time period $T_c$ is determined to be 16 hours. In this case, since the abandoned time period $T_c$ is shorter than the threshold $T_h$ (20 hours), the second intermittent maintenance is not executed.

Moreover, the processing contents of the pre-return maintenance are set based on the duration of the abandoned time period $T_c$. With reference to FIG. 8, in the case where the abandoned time period $T_c$ is 11 hours or more, the ink circulation and the ink agitation of 60 minutes are set for the white and metallic inks. Moreover, the nozzle blade wiping and the nozzle suction wiping are set to be executed for the print head 101. The ink circulation of 30 minutes is set for the chromatic color inks. Moreover, the nozzle blade wiping and the nozzle suction wiping are set to be executed for the print head 101.

The CPU 501 sets the start time $t_s$ of the pre-return maintenance for the white and metallic inks to 7:30, April 1st that is 60 minutes before the return time $t_e$, and transitions to the halt state. Although the start time $t_s$ of the pre-return maintenance for the chromatic color inks is set to 8:00, April 1st, illustration thereof is omitted in FIG. 10.

The time is managed by the counter 605 during the halt period. The CPU 501 starts the pre-return maintenance at the pre-return maintenance start time $t_s$, and completes the pre-return maintenance before the return time. The CPU 501 then sets the operation state to a state where printing can be started.

Figure 11:
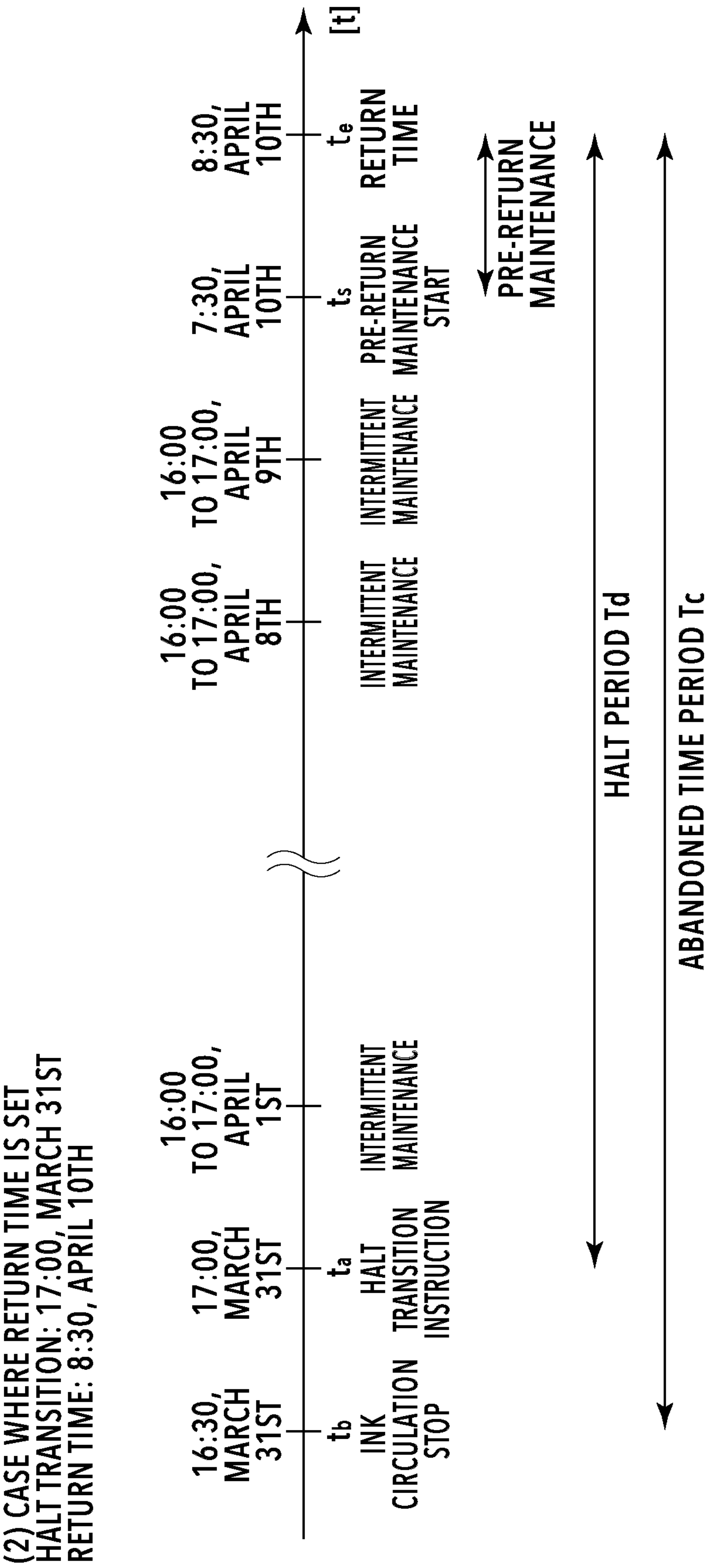
FIG. 11 is a diagram illustrating a maintenance example in the case where the return time is set in the return timer.

FIG. 11 is an example (2) in the case where the return time $t_e$ is set in the return timer 611. The example of FIG. 11 is different from the example illustrated in FIG. 10 in that the return time $t_e$ is set to "8:30, April 10th". In this case, the abandoned time period $T_c$ is nine days and 16 hours, and is equal to or more than the threshold $T_h$ (20 hours). Accordingly, the second intermittent maintenance is set by the CPU 501 to be executed.

In the example of FIG. 11, in the second intermittent maintenance, the ink circulation and the ink agitation are repeatedly performed for the operation time period of one hour after the non-operation time period of 23 hours. Note that the contents of the pre-return maintenance are similar to those in the example of FIG. 10, and a time 60 minutes before the return time $t_e$ is set as the start time $t_s$ of the pre-return maintenance for the white and metallic inks. Accordingly, "7:30, April 10th" is set as the start time $t_s$ of the pre-return maintenance. Although the start time $t_s$ of the pre-return maintenance for the chromatic color inks is set to "8:00 April 10th", illustration thereof is omitted in FIG. 11.

Figure 12:
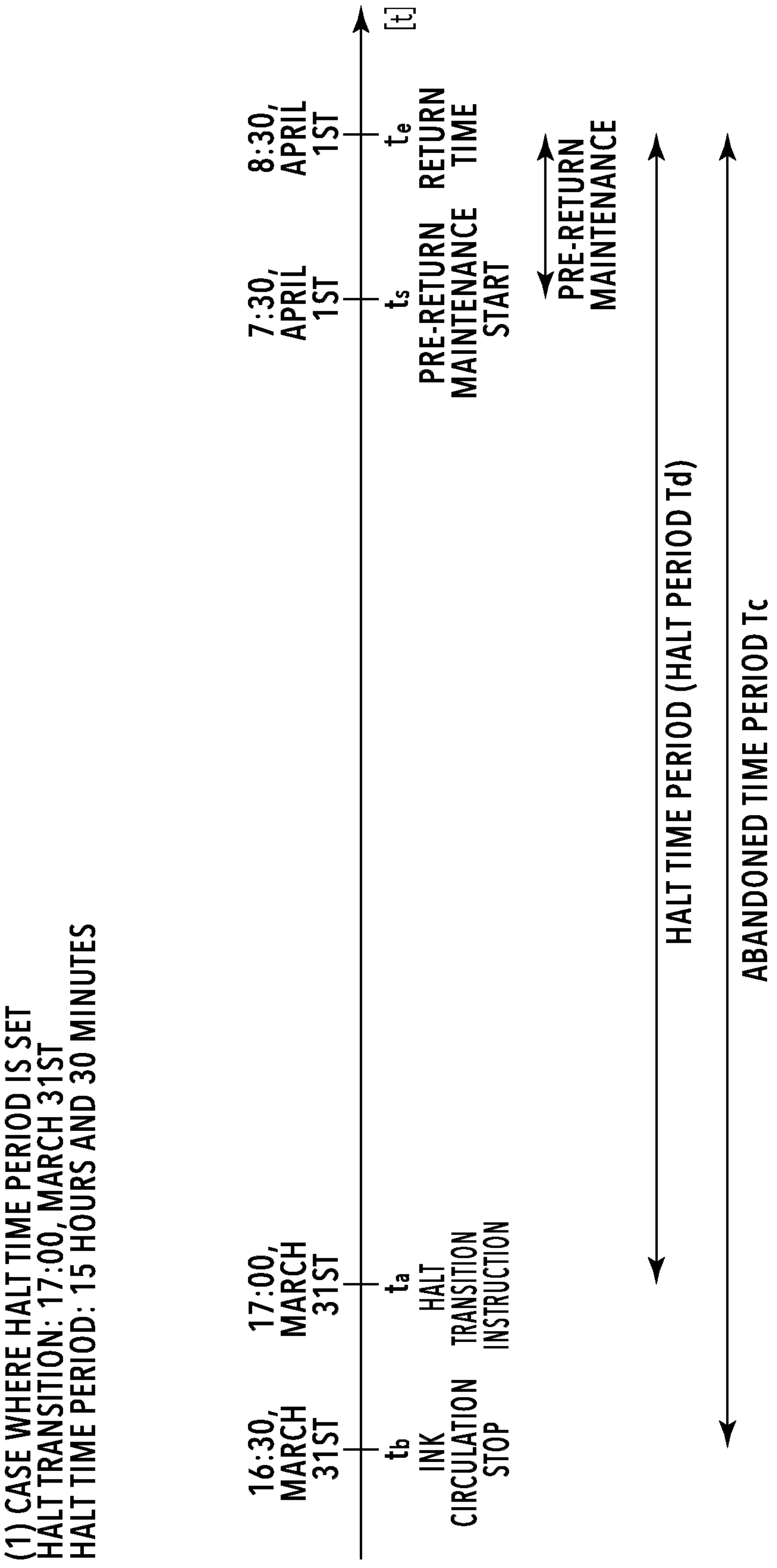
FIG. 12 is a diagram illustrating a maintenance example in the case where a halt time period is set in the return timer.

FIG. 12 illustrates the example (1) in the case where the halt time period $T_d$ (duration of the halt period) is set in the return timer 611. In the example of FIG. 12, the halt transition instruction is inputted at "17:00, March 31st" (time $t_a$), and "15 hours and 30 minutes" is set as the halt time period $T_d$ (halt period) in the return timer 611. The end time (ink circulation stop time $t_b$) of the last ink circulation before the transition to the halt state is assumed to be "16:30, March 31st". Moreover, the CPU 501 determines that the return time $t_e$ is "8:30, April 1st" that is a time at which the halt time period $T_d$ elapses from the time $t_a$ at which the halt transition instruction is inputted.

The CPU 501 determines a time period from the ink circulation stop time $t_b$ (16:30, March 31st) to the halt transition instruction (17:00, March 31st) to be 30 minutes, and determines the abandoned time period $T_c$, from this time period (30 minutes) and the halt time period $T_d$ (15 hours and 30 minutes) set in the return timer 611. As a result, the abandoned time period $T_c$ is determined to be 16 hours. In this case, since the abandoned time period $T_c$ is shorter than the threshold $T_h$ (20 hours), the second intermittent maintenance is not set.

Moreover, the contents of the pre-return maintenance are set based on the duration of the abandoned time period $T_c$. As a result, as in the example of FIG. 10, the ink circulation and the ink agitation of 60 minutes are set for the white and metallic inks. Moreover, the nozzle blade wiping and the nozzle suction wiping are set to be executed. The ink circulation of 30 minutes is set for the chromatic color inks. Moreover, the nozzle blade wiping and the nozzle suction wiping are set to be executed.

The CPU 501 sets the start time $t_s$ of the pre-return maintenance for the white and metallic inks to 7:30, April 1st, and transitions to the halt state. Although the start time $t_s$ of the pre-return maintenance for the chromatic color inks is set to 8:00, April 1st, illustration thereof is omitted in FIG. 12.

Figure 13:
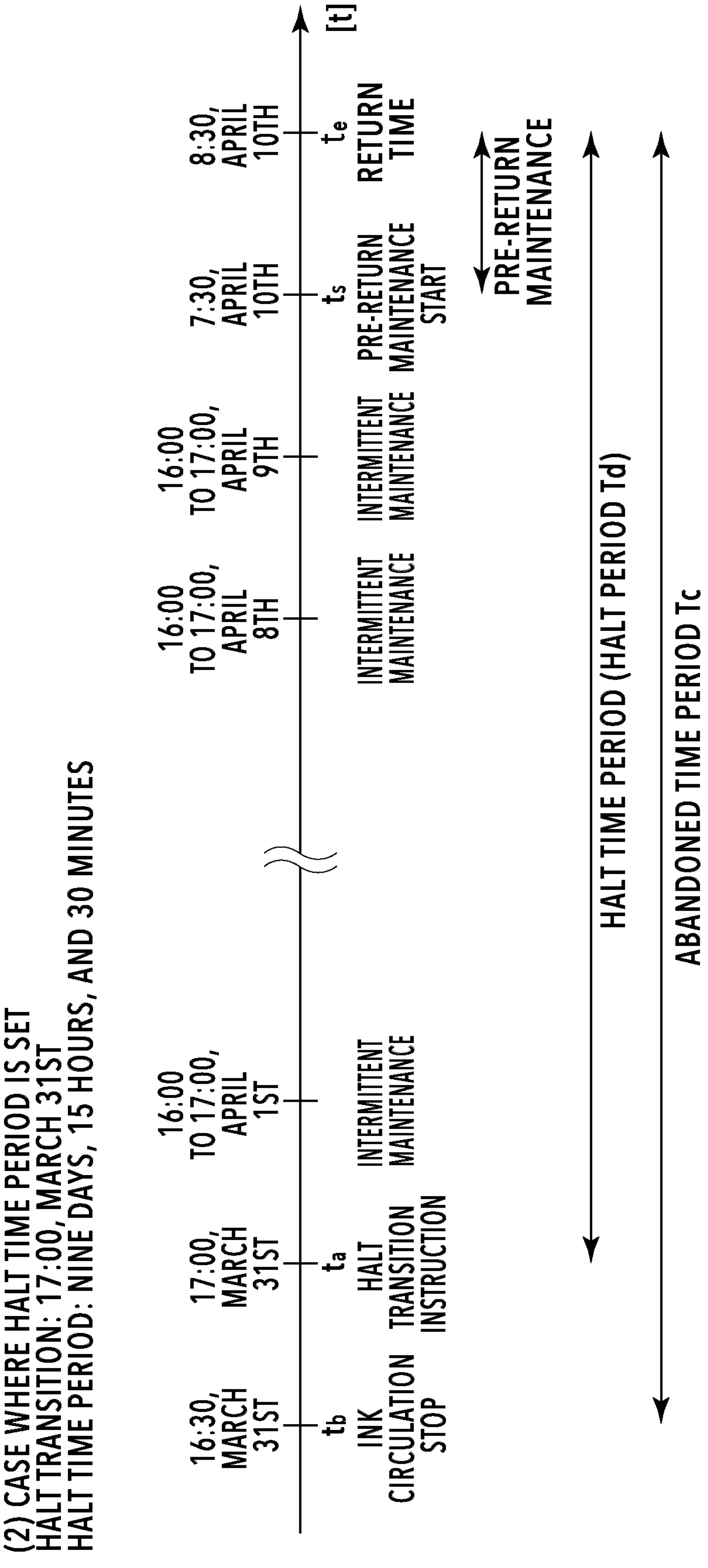
FIG. 13 is a diagram illustrating a maintenance example in the case where the halt time period is set in the return timer.

FIG. 13 is the example (2) in the case where the halt time period $T_d$ is set in the return timer 611. The example of FIG.

13 is different from the example illustrated in FIG. 12 in that the halt time period $T_d$ is set to "nine days, 15 hours, and 30 minutes". In this case, the abandoned time period $T_c$ is nine days and 16 hours, and is equal to or more than the threshold $T_h$ (20 hours). Accordingly, the second intermittent maintenance is set by the CPU 501 to be executed.

In the example of FIG. 13, in the second intermittent maintenance, the ink circulation and the ink agitation are repeatedly performed for the operation time period of one hour after the non-operation time period of 23 hours. Note that the contents of the pre-return maintenance are similar to those in the example of FIG. 10, and a time 60 minutes before the return time $t_e$ is set as the start time $t_s$ of the pre-return maintenance for the white and metallic inks. Accordingly, "7:30, April 10th" is set as the start time $t_s$ of the pre-return maintenance. Although the start time $t_s$ of the pre-return maintenance for the chromatic color inks is set to "8:00 April 10th", illustration thereof is omitted in FIG. 13.

Figure 14:
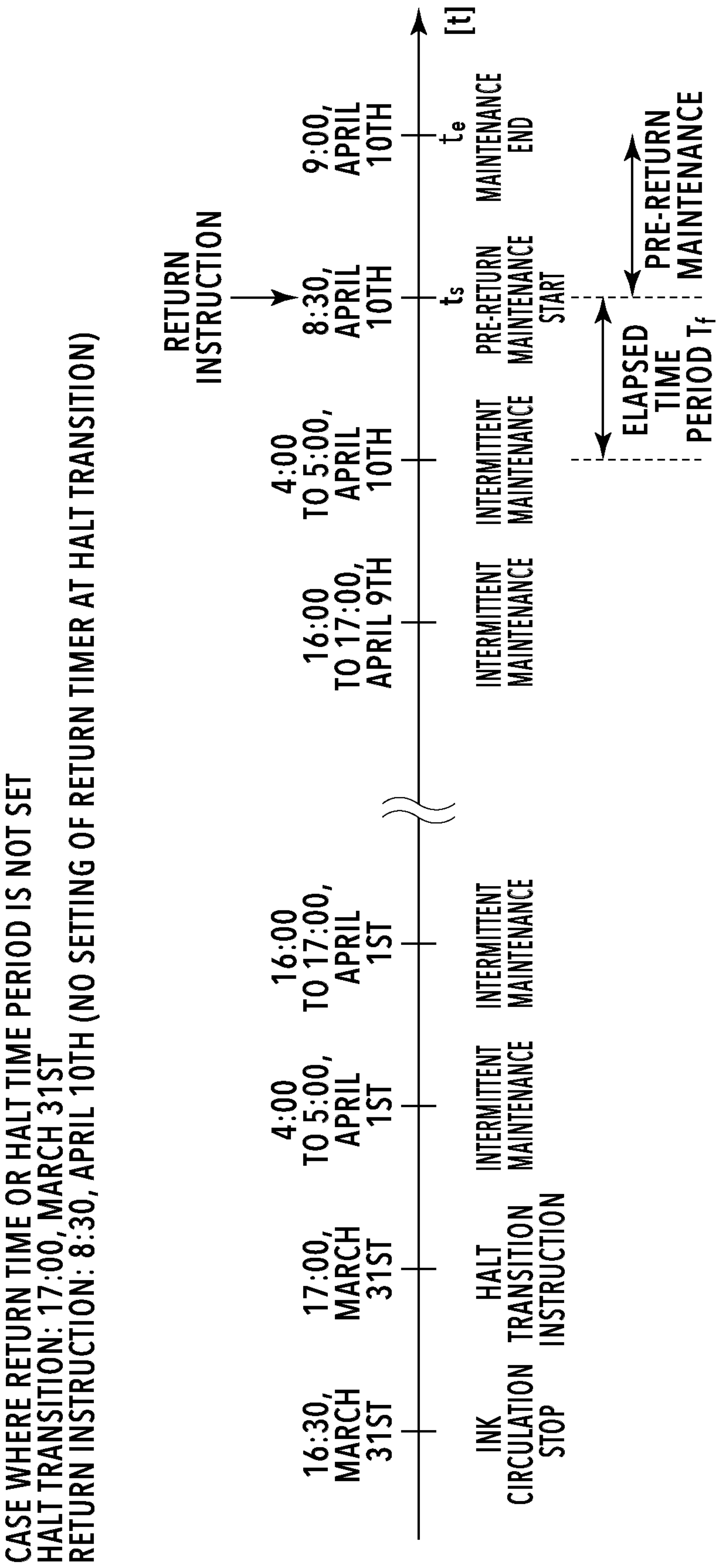
FIG. 14 is a diagram illustrating a maintenance example in the case where the inkjet printing apparatus transitions to the halt state with the return timer not being set.

FIG. 14 is an example of the maintenance operation in the case where the return timer 611 is not set. In this case, the duration of the halt period or the return time $t_e$ is undetermined. In the case where the halt transition instruction is inputted, the CPU 501 performs setting such that the first intermittent maintenance is executed during the halt period, and then transitions to the halt state.

In the example of FIG. 14, in the first intermittent maintenance, the ink circulation and the ink agitation are repeatedly performed for the operation time period of one hour after the non-operation time period of 11 hours. Moreover, the pre-return maintenance is started in the case where the user manually inputs the return instruction. In the example of FIG. 14, the return instruction is inputted at "8:30, April 10th". The CPU 501 obtains the end time of the last ink circulation before the input of the return instruction, and determines the contents of the pre-return maintenance depending on the elapsed time period $T_f$ from this end time to the time of the input of the return instruction. Then, the CPU 501 immediately starts the pre-return maintenance.

In the example of FIG. 14, the time at which the return instruction is inputted is "8:30, April 10th", and the end time of the last ink circulation before this time is "5:00, April 10th". Accordingly, the elapsed time period $T_f$ is three hours and 30 minutes. In the case where the "abandoned time period" in the table of FIG. 8 is read as "elapsed time period" and is referred to, the ink circulation and the ink agitation of 30 minutes is set for the white and metallic inks in the case where the elapsed time period is three hours and 30 minutes. The ink circulation of 15 minutes is set for the chromatic color inks.

Accordingly, after the time "8:30, April 10th" at which the return instruction is inputted, the pre-return maintenance is immediately started upon determination of the processing contents. The pre-return maintenance of 30 minutes is executed for the white and metallic inks, and the pre-return maintenance is completed at "9:00, April 10th". Although the pre-return maintenance of 15 minutes is executed for the chromatic color inks and the pre-return maintenance is completed at "8:45, April 10th", illustration thereof is omitted in FIG. 14.

Figure 15:
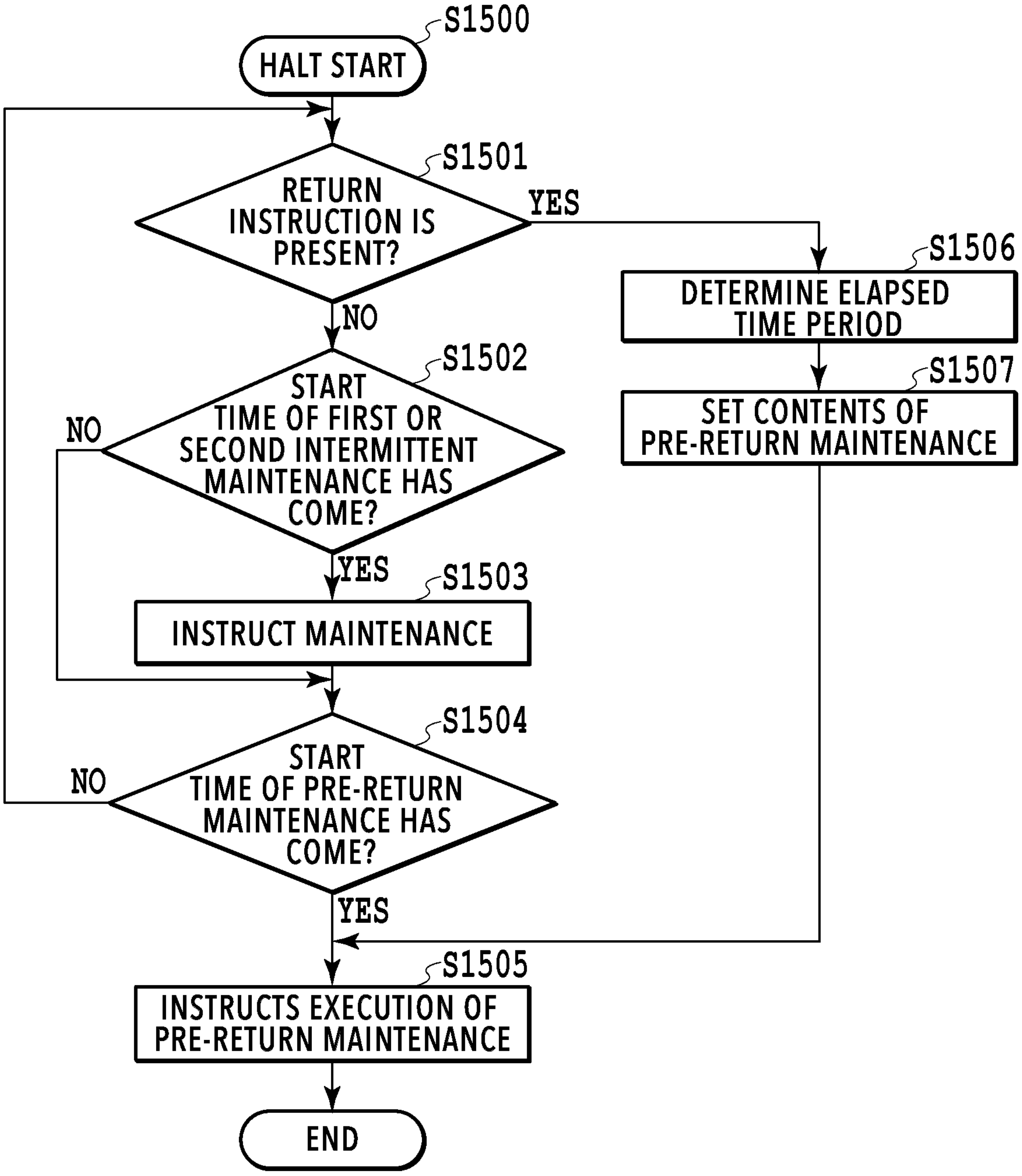
FIG. 15 is a flowchart illustrating a flow of processing executed during the halt period.

Next, processing executed by the CPU 501 in the halt period (halt state) is explained. FIG. 15 is a flowchart illustrating a flow of the processing executed by the CPU 501 after the transition to the halt state. Note that the processing illustrated in FIG. 15 starts with the start of the halt state (S1500).

In the case where the printing apparatus 100 transitions to the halt state without the setting of the return timer 611, the first intermittent maintenance is set to be executed by the processing of FIG. 9. Accordingly, the printing apparatus 100 is in the state where a start time and an operation time period (or the end time) of one or multiple times of the ink circulation and the ink agitation are set by the CPU 501. The start time and the operation time period (or the end time) are determined based on the operation time period and the non-operation time period of the ink circulation and the ink agitation in the first intermittent maintenance. The start time and the processing contents of the pre-return maintenance are in an undetermined state.

In the case where the printing apparatus 100 transitions to the halt state after the setting of the return timer 611, the start time $t_s$ and the processing contents of the pre-return maintenance are determined by the processing of FIG. 9. Moreover, in the case where the abandoned time period $T_c$ is longer than the threshold $T_h$ and the second intermittent maintenance is set to be executed, the start time and the operation time period (or the end time) of the ink circulation and the ink agitation in the second intermittent maintenance are set for one or multiple times. The start time and the operation time period (or the end time) of the ink circulation and the ink agitation are determined based on the operation time period and the non-operation time period of the ink circulation and the ink agitation in the second intermittent maintenance.

In S1501, the CPU 501 determines presence or absence of the manual return instruction by the user. In the case where the manual return instruction is not inputted, the processing proceeds to S1502. In the case where the return instruction is inputted, the processing proceeds to S1506. Note that the manual return instruction can be inputted irrespective of presence or absence of the setting of the return timer 611.

In S1502, the CPU 501 determines whether the start time of the first intermittent maintenance or the second intermittent maintenance has come. In the case where the start time of the first intermittent maintenance or the second intermittent maintenance has come, the processing proceeds to S1503.

In S1503, the CPU 501 instructs start of the maintenance. The CPU 501 instructs the ink circulation unit 200 and the ink agitation unit 220 to start the maintenance depending on the processing contents of the maintenance. The ink circulation unit 200 and the ink agitation unit 220 execute the maintenance processing including the ink circulation and the ink agitation according to the instruction from the CPU 501. In the case where the operation time period elapses (or the end time comes), the CPU 501 stops the maintenance processing.

The processing proceeds to S1504 in the case where the CPU 501 determines the start time of the first intermittent maintenance or the second intermittent maintenance has not come in the determination of S1502 or after the maintenance instruction is performed in S1503.

In S1504, the CPU 501 determines whether the start time $t_s$ of the pre-return maintenance has come. In the case where the start time $t_s$ of the pre-return maintenance has come, the processing proceeds to S1505. In the case where the start time $t_s$ of the pre-return maintenance has not come, the processing returns to S1501.

In S1505, the CPU 501 instructs start of the pre-return maintenance. The CPU 501 instructs the ink circulation unit 200 and the ink agitation unit 220 or the maintenance unit 520 to start the maintenance depending on the processing contents of the maintenance determined in the processing illustrated in FIG. 9. The ink circulation unit 200 and the ink agitation unit 220 or the maintenance unit 520 execute the maintenance processing including the ink circulation and the ink agitation according to the instruction from the CPU 501. In the case where the operation time period elapses (or the end time comes), the CPU 501 stops the maintenance processing.

In the case where the CPU 501 determines that the return instruction has been manually inputted by the user in S1501, in S1506, the CPU 501 determines the elapsed time period $T_f$. The elapsed time period $T_f$ is a time period from the time at which the last ink circulation before the input of the return instruction is completed to the time at which the return instruction is inputted.

Specifically, in the case where the return instruction is inputted after the transition to the halt state and before the execution of the first or second intermittent maintenance, the elapsed time period $T_f$ is a time period (=abandoned time period $T_c$) from the end time of the ink circulation lastly executed before the transition to the halt period to the time of input of the return instruction. In the case where the return instruction is inputted after the transition to the halt state and after the execution of at least one time of the first or second intermittent maintenance, the elapsed time period $T_f$ is determined as follows. The elapsed time period $T_f$ is a time period from the end time of the ink circulation in the first or second intermittent maintenance executed immediately before the input of the return instruction to the time of the input of the return instruction.

In S1507, the CPU 501 determines the processing contents of the pre-return maintenance based on the determined elapsed time $T_f$. For example, the CPU 501 reads the "abandoned time period $T_c$" in the table 800 illustrated in FIG. 8 as "elapsed time $T_f$", and determines the processing contents of the maintenance according to the elapsed time $T_f$. Then, the processing proceeds to S1505, and the CPU 501 instructs execution of the pre-return maintenance in the processing contents determined in S1507, and terminates the present flowchart.

As described above, the relationship between the processing contents of the maintenance and the abandoned time period $T_c$ and the relationship between the operation time period and the non-operation time period in the first and second intermittent maintenance are determined in consideration of the allowable waiting time period for the completion of the pre-return maintenance after the input of the return instruction. Accordingly, the waiting time period of the user is suppressed within the allowable waiting time period.

As explained above, the printing apparatus 100 of the present embodiment executes the pre-return maintenance including the ink circulation after the predetermined halt period, and completes the pre-return maintenance before the return time set by the return timer 611. Since the halt period is provided, this configuration can reduce the operation time period of the ink circulation unit 200. Moreover, it is possible to reduce the time period for which the user has to wait until the printing apparatus 100 goes into a state where the ink can be ejected without concentration unevenness after the return from the halt state. Furthermore, since the intermittent maintenance is executed at the predetermined time intervals during the halt period, the maintenance time period before the return can be reduced.

Moreover, also in the case where the return timer is not set, the intermittent maintenance is executed at the predetermined time intervals during the halt period. Accordingly, the time period required for the pre-return maintenance executed after the input of the return instruction can be reduced. Thus, it is possible to reduce the time period required for the printing apparatus 100 to go into a state where the ink can be ejected without concentration unevenness after the return from the halt state.

Although description is given of the example in which the ink circulation and the ink agitation are executed for the white and metallic inks and the ink circulation is executed for the chromatic color inks in the pre-return maintenance and the first and second intermittent maintenance in the printing apparatus 100 of the first embodiment, the processing contents of the maintenance are not limited to this. The maintenance processing including the ink circulation and the ink agitation can be executed for all types of inks, or only the ink circulation may be executed in the maintenance processing for all types of inks. Moreover, although description is given of the example in which the return timer 611 is set before the transition to the halt period, the present disclosure is not limited to this, and the setting of the return timer 611 may be received after the transition to the halt period. In the case where the return timer 611 is set after the transition to the halt period, the CPU 501 sets the start time $t_s$ of the pre-return maintenance based on the return time $t_e$ set in the return timer 611. Moreover, for example, it is preferable that a time period from an end time of the last ink circulation before a time at which the return timer 611 is set to the return time $t_e$ is determined as the abandoned time period $T_c$, and the processing contents of the pre-return maintenance is determined depending on the abandoned time period $T_c$.

Moreover, although description is given of the example in which the waiting time period allowable by the user after the return instruction input is one hour at maximum, the waiting time period is not limited to this example, and may be any time period. Furthermore, the configuration may be such that the user sets the waiting time period allowable by the user.

Second Embodiment

Next, a second embodiment of the present disclosure is explained. In the printing apparatus capable of using multiple types of inks such as the white ink and the chromatic color inks, the contents of maintenance can be set to vary depending on the type of ink (see FIG. 8). In this case, even in the case where the maintenance is started at the same time, the time at which the maintenance ends varies depending on the type of ink.

Accordingly, in the printing apparatus 100 of the second embodiment, in the case where the maintenance is completed for the inks to be used in the print job, the start of the print job is made possible even in the case where the maintenance is ongoing for the other inks. This can reduce the waiting time period of the user in some cases depending on the types of inks used in the image data to be printed.

Since the hardware configuration and the functional configuration (FIGS. 1 to 6) of the printing apparatus 100 in the second embodiment are the same as those in the first embodiment, the same parts are denoted by the same reference numerals, and detailed explanation thereof is omitted. The presence or absence of the setting in the return timer and the maintenance processing (FIGS. 9 and 15) depending on the setting contents are also the same as those in the first embodiment. Moreover, as illustrated in FIG. 8, maintenance whose processing contents vary depending on the type of ink is assumed to be set.

In the second embodiment, the CPU 501 manages information on whether the pre-return maintenance is completed or not for each type of ink. Moreover, the CPU 501 controls reception of the print job, analysis and storage of job data, and start of the print job.

FIG. 16 is a diagram illustrating an example of a flag (hereinafter, referred to as completion flag 1600) that is managed by the CPU 501 and that indicates whether or not the pre-return maintenance is completed. The CPU 501 (maintenance control component 610) monitors start and completion of the pre-return maintenance for each of the ink circulation units 200 provided for the respective types of inks. The CPU 501 sets the completion flag 1600 to a value "0" in the case where the pre-return maintenance is started, and sets the completion flag 1600 to a value "1" in the case where the pre-return maintenance is completed.

For example, assume that the pre-return maintenance of 30 minutes is set for the chromatic color inks, and the pre-return maintenance of 60 minutes is set for the white and metallic inks. In this case, in the case where the pre-return maintenance is simultaneously started for both types of inks, the pre-return maintenance for the chromatic color inks completes 30 minutes earlier than the pre-return maintenance for the white and metallic inks. The completion flag 1600 in this state is such that "0" is set for the white (W) ink, and "1" is set for each of the inks of C, M, Y, and K as illustrated in FIG. 16.

Figure 17:
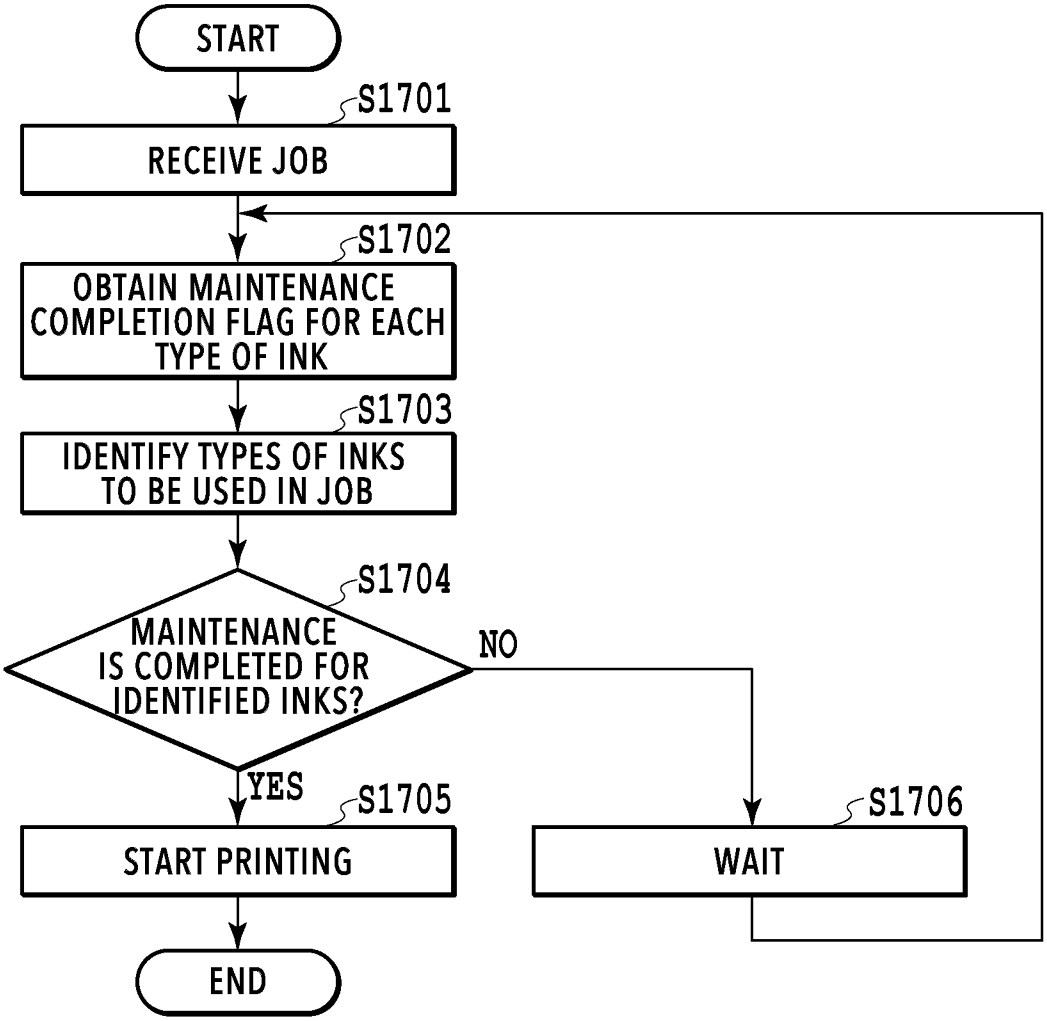
FIG. 17 is a flowchart illustrating a flow of job receiving processing in the case where there are multiple types of inks.

FIG. 17 is a flowchart illustrating a flow of job receiving processing executed by the CPU 501 of the printing apparatus 100 in the second embodiment. The present flowchart starts in the case where the printing apparatus 100 receives the print job transmitted from the host apparatus 530.

In S1701, the CPU 501 receives the print job. The CPU 501 stores the received print job in the RAM 503.

In S1702, the CPU 501 obtains the completion flag 1600 of the maintenance for each type of ink.

In S1703, the CPU 501 analyzes the print job received in S1701, and identifies the types of inks to be used for the image data included in the print job.

In S1704, the CPU 501 checks whether the maintenance is completed for all types of inks identified in S1703. In the case where the completion flag 1600 is set to "1" (completed) for all identified types of inks, the CPU 501 determines YES in S1704, and the processing proceeds to S1705.

In S1705, the CPU 501 instructs start of the print job received in S1701.

Meanwhile, in the case where the completion flag 1600 obtained in S1702 is set to "0" (ongoing) for at least one of the identified types of inks, the CPU 501 determines NO in S1704, and the processing proceeds to S1706.

In S1706, the CPU 501 waits for start of the print job received in S1701, and returns to S1702. Thereafter, the CPU 501 repeats the processes of S1702 to S1704, starts printing in the case where the maintenance is completed for all identified types of inks, and terminates the present flowchart.

As explained above, the printing apparatus 100 of the second embodiment performs control such that the maintenance is executed with the contents thereof varied depending on the type of ink in the case where there are multiple types of inks.

Moreover, in the case where the printing apparatus 100 of the second embodiment receives the print job, the printing apparatus 100 determines whether the maintenance for the inks to be used in the received print job is completed. In the case where the maintenance is completed for the inks to be used in the received print job, the printing apparatus 100 performs control such that printing relating to the print job is started. Accordingly, printing can be started at an earlier timing even in the case where the maintenance for all types of inks is not completed.

For example, in the case where the print job in which only the chromatic color inks are used and no white ink is used is received, the CPU 501 can start the print processing using the chromatic color inks in parallel while the maintenance for the white ink is ongoing.

Note that the processing contents of the maintenance described in the above embodiments are examples, and the present disclosure is not limited to these. Since processing steps and processing time periods required for the maintenance vary depending on the composition of the ink and an environment, it is preferable that appropriate processing time periods and processing steps are set.

Moreover, in the above-mentioned embodiment, explanation is given of the case where the printing apparatus 100 and the host apparatus 530 are connected to each other via the network such as LAN as illustrated in FIG. 5. However, exchange of data between the apparatuses may be performed by using a USB memory or the like in an offline state.

Furthermore, in the above-mentioned embodiments, description is given of the example in which the printing apparatus 100 receives the setting of the return timer and the return instruction from the host apparatus 530. However, the printing apparatus 100 may receive the setting of the return timer and the return instruction by using the operation panel 506 in the main body of the printing apparatus 100. The setting screen of the return timer is also not limited to the example in the above-mentioned embodiments, and may have any screen configuration.

Moreover, in the above-mentioned embodiments, description is given of the example in which the CPU 501 of the printing apparatus 100 executes the processing of the flowcharts illustrated in FIGS. 9 and 15. However, this processing may be executed by a CPU of the host apparatus 530. In this case, the CPU of the host apparatus 530 determines the start time of the pre-return maintenance and the start time, the operation time period, and the like in the first and second intermittent maintenance depending on the setting of the return timer, and transmits the start times, the operation time period, and the like to the printing apparatus 100. Moreover, the CPU of the host apparatus 530 may monitor the start time of the maintenance in the printing apparatus 100 during the halt period, and transmit a maintenance start instruction to the printing apparatus 100 in the case where the start time comes.

Although the preferable embodiments according to the present disclosure are explained above with reference to the attached drawings, the present disclosure is not limited to these examples. It is apparent that those skilled in the art can come up with various change examples and modification examples within the scope of the technical idea disclosed in the present application, and these examples are also understood to belong to the technical scope of the present disclosure as a matter of course.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The inkjet printing apparatus of the present disclosure can reduce the time it takes for the inkjet printing apparatus to go to the state where the ink can be ejected without the concentration unevenness after returning from the halt state while reducing the operation time period of the ink circulation.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-220888, filed Dec. 27, 2023, which is hereby incorporated by reference wherein in its entirety.

What is claimed is:

1. An inkjet printing apparatus comprising:

a print head configured to perform a print operation of printing an image by ejecting an ink;

a circulation unit configured to circulate the ink by supplying the ink from a tank to the print head and returning the ink collected from the print head to the tank;

a control unit configured to control the print operation by the print head and ink circulation by the circulation unit; and an obtaining unit configured to obtain a return time that is a time at which the inkjet printing apparatus returns from a first state that is a state in which the print operation is halted to a second state that is a state in which the print operation is executable, wherein the control unit executes pre-return maintenance including the ink circulation by the circulation unit for causing the inkjet printing apparatus to return to the second state after transition of the inkjet printing apparatus to the first state, and completes the pre-return maintenance before the return time obtained by the obtaining unit.

2. The inkjet printing apparatus according to claim 1, wherein the control unit sets a time going back from the return time by at least a time period required for the pre-return maintenance as a start time of the pre-return maintenance, and starts the pre-return maintenance in the case where the set start time comes.

3. The inkjet printing apparatus according to claim 2, wherein the control unit sets the start time, before the transition to the first state.

4. The inkjet printing apparatus according to claim 1, further comprising a reception unit configured to receive setting of the return time by a user, wherein the obtaining unit obtains a time received by the reception unit before the transition to the first state, as the return time.

5. The inkjet printing apparatus according to claim 1, further comprising a reception unit configured to receive setting of a time period in which the inkjet printing apparatus is to be set to the first state by a user, wherein the obtaining unit obtains the return time based on a duration of the time period in which the inkjet printing apparatus is to be set to the first state and that is received by the reception unit before the transition to the first state.

6. The inkjet printing apparatus according to claim 1, wherein the control unit determines processing contents of the pre-return maintenance based on a time period from an end time of the ink circulation lastly executed by the circulation unit before the transition to the first state to the return time.

7. The inkjet printing apparatus according to claim 1, wherein, in the case where the obtaining unit is unable to obtain the return time before the transition to the first state, the control unit executes first intermittent maintenance in which the ink circulation by the circulation unit is performed intermittently at predetermined time intervals, after the transition to the first state.

8. The inkjet printing apparatus according to claim 7, further comprising an agitation unit configured to agitate the ink in the tank, wherein the first intermittent maintenance includes ink agitation by the agitation unit.

9. The inkjet printing apparatus according to claim 8, wherein in the case where the obtaining unit is unable to obtain the return time before transition to the first state, the control unit executes the first intermittent maintenance including the ink circulation by the circulation unit and the ink agitation by the agitation unit at predetermined time intervals, after the transition to the first state, and a relationship between a ratio X1 of an operation time period to a non-operation time period of the circulation unit in the first intermittent maintenance and a ratio X2 of the operation time period to the non-operation time period of the agitation unit in the first intermittent maintenance is $X1 \leq X2$.

10. The inkjet printing apparatus according to claim 1, wherein in the case where the obtaining unit obtains the return time before the transition to the first state, and a time period from an end time of the ink circulation lastly executed by the circulation unit before the transition to the first state to the return time is equal to or more than a threshold, the control unit executes second intermittent maintenance in which the ink circulation by the circulation unit is intermittently performed at predetermined time intervals until start of the pre-return maintenance, after the transition to the first state.

11. The inkjet printing apparatus according to claim 10, further comprising an agitation unit configured to agitate the ink in the tank, wherein the second intermittent maintenance includes ink agitation by the agitation unit.

12. The inkjet printing apparatus according to claim 10, wherein a relationship between an operation time period A1 of the circulation unit in the pre-return maintenance and an operation time period B1 of the circulation unit in the second intermittent maintenance is A1≤B1.

13. The inkjet printing apparatus according to claim 11, wherein a relationship between an operation time period A2 of the agitation unit in the pre-return maintenance and an operation time period B2 of the agitation unit in the second intermittent maintenance is A2≤B2.

14. The inkjet printing apparatus according to claim 1, wherein, in the case where return to the second state is instructed in the first state, the control unit immediately starts the pre-return maintenance.

15. The inkjet printing apparatus according to claim 14, wherein the control unit determines processing contents of the pre-return maintenance based on a time period from a time at which the return to the second state is instructed to an end time of the ink circulation lastly executed before the time.

16. The inkjet printing apparatus according to claim 1, wherein in the case where the obtaining unit is unable to obtain the return time before the transition to the first state, the control unit executes first intermittent maintenance in which the ink circulation by the circulation unit is performed intermittently at predetermined time intervals, after the transition to the first state, in the case where the obtaining unit obtains the return time before the transition to the first state and a time period from an end time of the ink circulation lastly executed by the circulation unit before the transition to the first state to the return time is equal to or more than a threshold, the control unit executes second intermittent maintenance in which the ink circulation by the circulation unit is intermittently performed at predetermined time intervals until start of the pre-return maintenance, after the transition to the first state, and a relationship between a ratio X1 of an operation time period to a non-operation time period of the circulation unit in the first intermittent maintenance and a ratio Y1 of the operation time period to the non-operation time period of the circulation unit in the second intermittent maintenance is X1≥Y1.

17. The inkjet printing apparatus according to claim 16, wherein the control unit controls the print head such that the ink is not ejected in the first intermittent maintenance or the second intermittent maintenance.

18. The inkjet printing apparatus according to claim 1, further comprising an agitation unit configured to agitate the ink in the tank, wherein the control unit causes the agitation unit to perform ink agitation in the pre-return maintenance.

19. The inkjet printing apparatus according to claim 18, wherein in the case where the obtaining unit is unable to obtain the return time before the transition to the first state, the control unit executes first intermittent maintenance in which the ink circulation by the circulation unit and the ink agitation by the agitation unit are performed intermittently at predetermined time intervals, after the transition to the first state, in the case where the obtaining unit obtains the return time before the transition to the first state and a time period from an end time of the ink circulation lastly executed before the transition to the first state to the return time is equal to or more than a threshold, the control unit executes second intermittent maintenance in which the ink circulation by the circulation unit and the ink agitation by the agitation unit are intermittently performed at predetermined time intervals until start of the pre-return maintenance, after the transition to the first state, and a relationship between a ratio X2 of an operation time period to a non-operation time period of the agitation unit in the first intermittent maintenance and a ratio Y2 of the operation time period to the non-operation time period of the agitation unit in the second intermittent maintenance is X2≥Y2.

20. The inkjet printing apparatus according to claim 18, wherein the control unit starts the ink agitation by the agitation unit simultaneously with the ink circulation by the circulation unit or before the ink circulation.

21. The inkjet printing apparatus according to claim 1, wherein the print head is capable of ejecting a plurality of types of the inks, and the control unit determines processing contents of the pre-return maintenance independently for each of the plurality of types of inks.

22. The inkjet printing apparatus according to claim 21, wherein, in the case where a print job is inputted before coming of the return time, the control unit starts the print operation according to the print job, at a moment where the pre-return maintenance is completed for the ink to be used in the print job.

23. The inkjet printing apparatus according to claim 1, wherein the ink includes a white ink.

24. The inkjet printing apparatus according to claim 1, wherein the ink includes a metallic ink.

25. A control method of an inkjet printing apparatus including a print head configured to perform a print operation of printing an image by ejecting an ink and a circulation unit configured to circulate the ink by supplying the ink from a tank to the print head and returning the ink collected from the print head to the tank, the control method comprising:

obtaining a return time that is a time at which the inkjet printing apparatus returns from a first state that is a state in which the print operation is halted to a second state that is a state in which the print operation is executable; and executing pre-return maintenance including ink circulation after transition to the first state such that the pre-return maintenance is completed before the return time.

* * * * *